July 25, 1972   G. O. WESTERLUND   3,679,568
CELL CONSTRUCTION
Filed Aug. 17, 1968   8 Sheets-Sheet 3

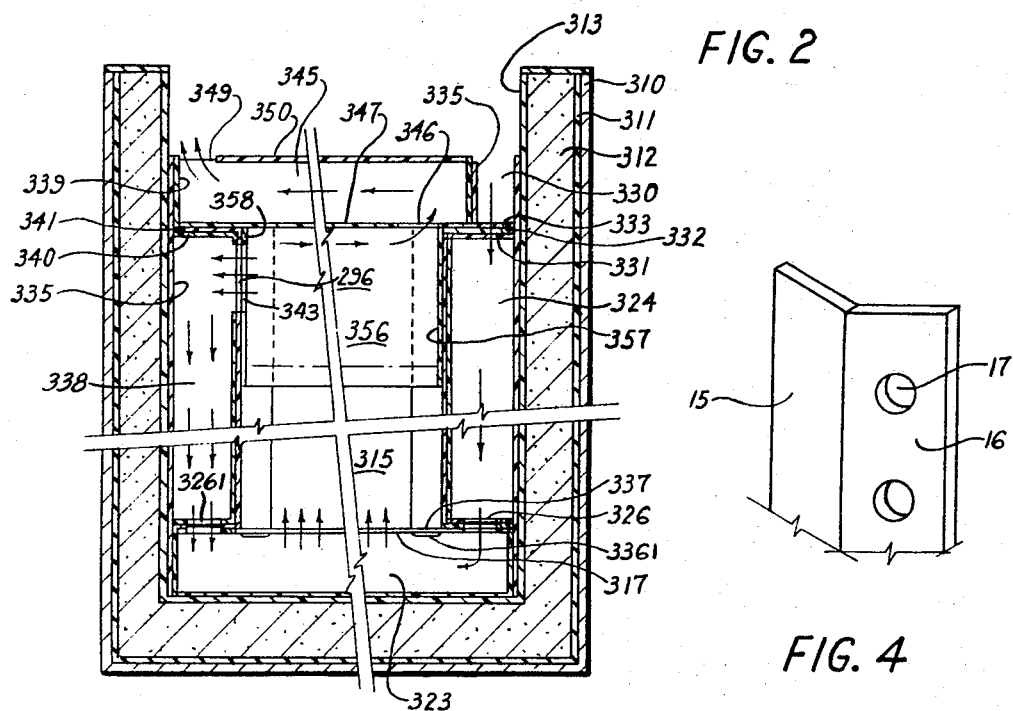
FIG. 2
FIG. 4
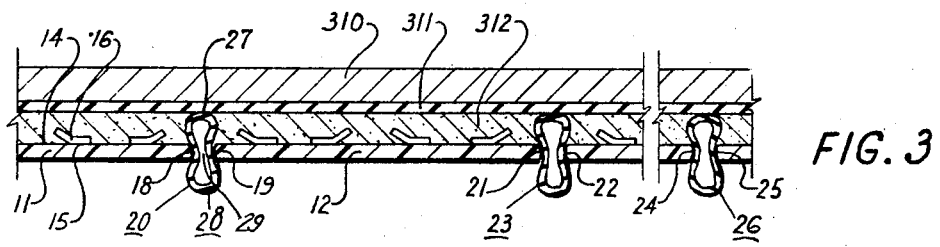
FIG. 3
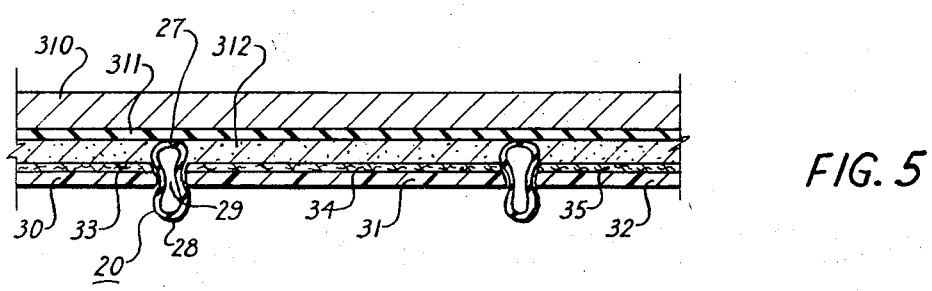
FIG. 5

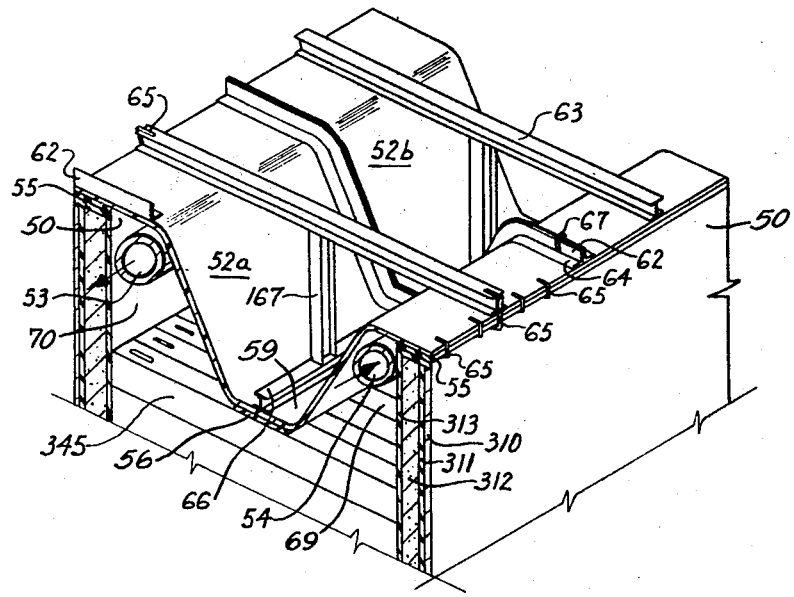
FIG. 9
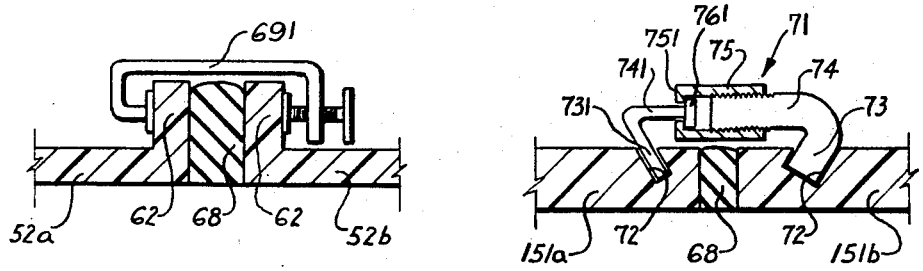
FIG. 10
FIG. 13
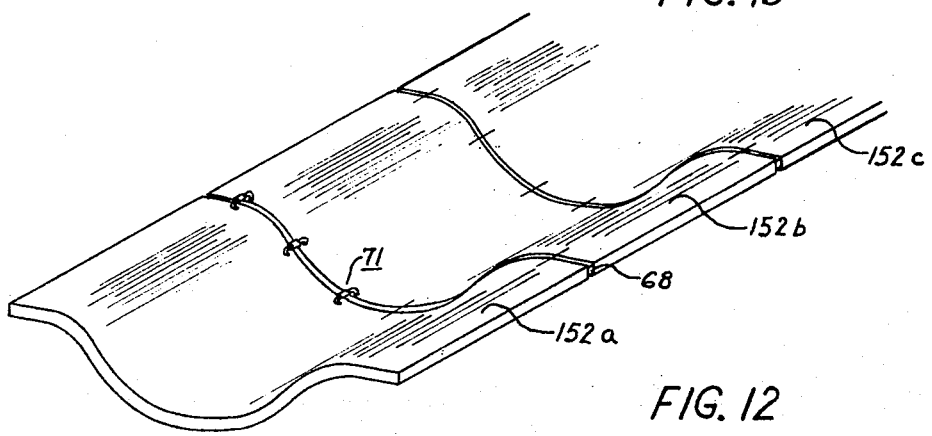
FIG. 12

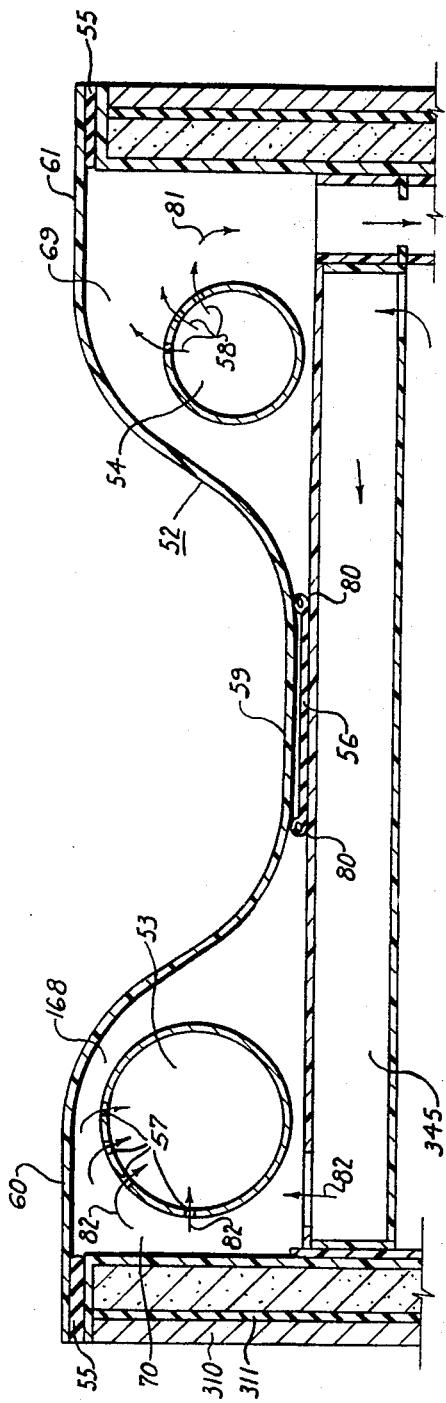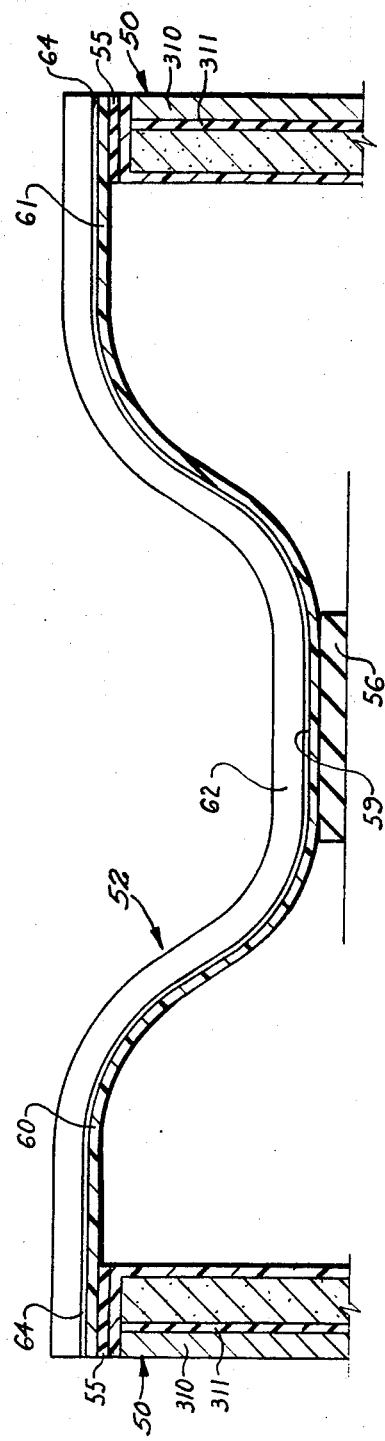

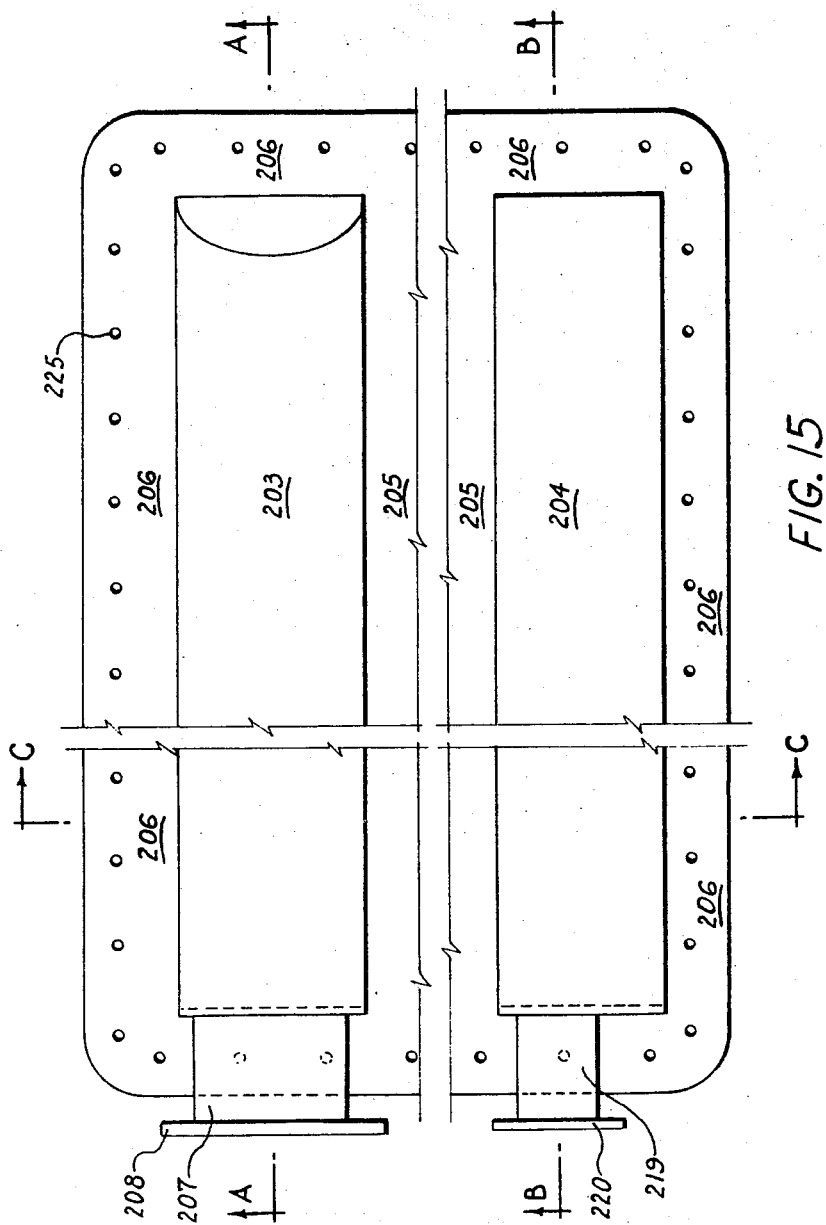

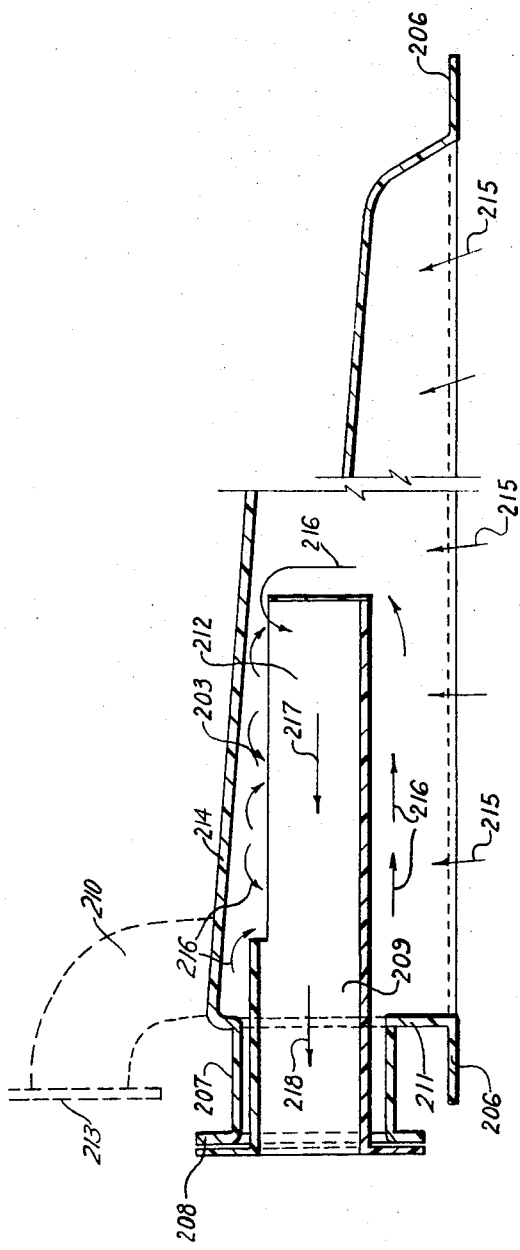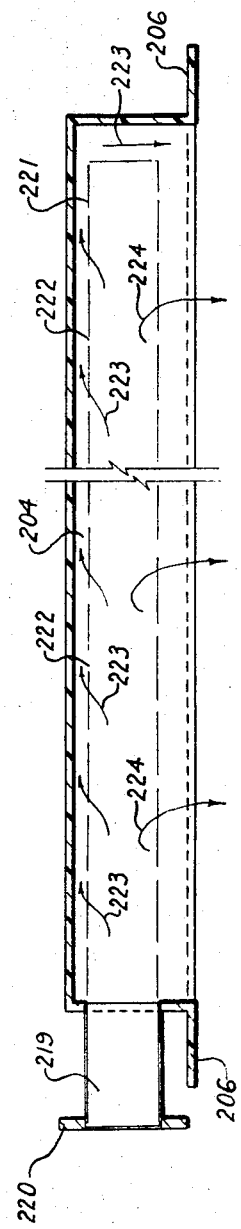

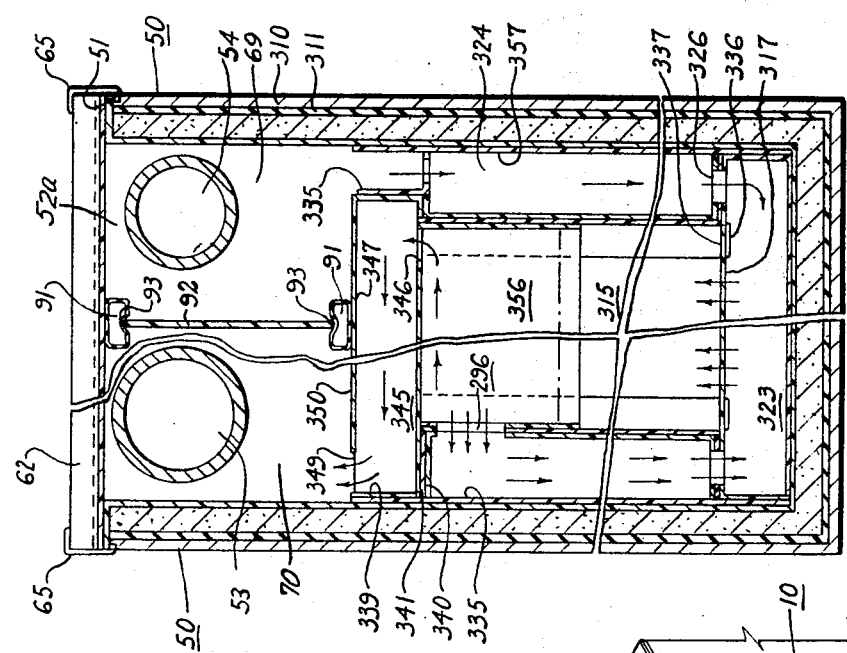
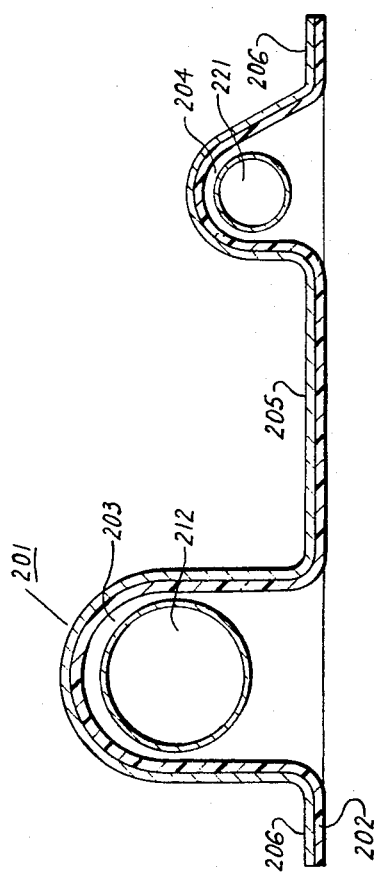
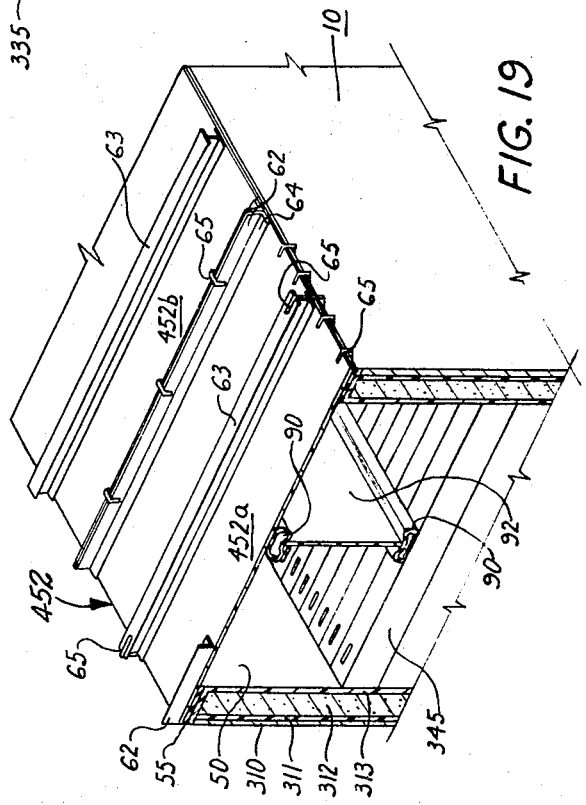

United States Patent Office 3,679,568
Patented July 25, 1972

3,679,568
CELL CONSTRUCTION
Gothe O. Westerlund, Vancouver, British Columbia, Canada, assignor to Chemech Engineering Ltd., Vancouver, British Columbia, Canada
Filed Sept. 17, 1968, Ser. No. 760,209
Claims priority, application Canada, Oct. 13, 1967, 002,445
Int. Cl. B01k 3/00; E01c 2/04
U.S. Cl. 204—242
84 Claims

ABSTRACT OF THE DISCLOSURE

An improved electrolytic cell of enhanced durability and ease of construction is provided which includes a novel cover member, with or without novel cell wall structure and/or novel internal structure of the electrolytic cell tank. The cover is characterized by three members which sealingly engage with the upper surface of the electrolytic cell tank to provide an inlet manifold and a separate and distinct outlet manifold, with the inner exposed surfaces of the cover being resistant to the chemicals within the electrolytic cell tank. The cell wall construction is characterized by a "sandwich" of an outer shell, an inner lining, formed of a single appropriately sized lining sheet or an array of lining sheets separated by, but joined by means of specified sealing members, and a mortar bonded to the shell and anchored to the lining.

---

The internal structure of the electrolytic cell tank includes a plurality of longitudinally extending spaced apart bipolar electrodes and two lateral, longitudinally extending monopolar electrodes, the space between adjacent electrodes constituting an electrolytic cell unit, inlet means for admitting liquor into each of the electrolytic cell units, a top header providing an outlet for liquor from each of the electrolytic cell units and one of the sealing members of the cover being sealingly engaged with the top header.

This invention relates to novel and improved construction of the walls and cover of electrolytic cells. The cells with which the present invention is particularly concerned are those cells which are suitable for the production of metal chlorates from aqueous solutions of metal chlorides and especially for the production of alkali metal chlorates from alkali metal chloride brines. Other cells with which the present invention is also concerned are those cells which are suitable for the production of perchlorates from sodium chlorate solutions, for the production of gaseous chlorine from hydrochloric acid solutions, and (if the cell is modified to include a diaphragm therein) for the production of gaseous chlorine and gaseous hydrogen. This invention relates more specifically to an improved electrolytic cell structure, namely a novel and improved particular construction of the cell walls as well as to a method for constructing the cell walls. This invention also relates to a novel closure member for such cells. This invention relates further to novel components and combinations of components within the improved cell.

Known electrolytic cells for the production of metal chlorates from aqueous solutions of metal chlorides using consumable carbon electrodes have certain disadvantages. Monopolar cells inherently have many power connections and electrolyte branches, high electrode stub losses, high voltage drop and high power losses. Furthermore, many units are required in commercial production and much larger building spaces are required.

Metal chlorates may also be produced electrolytically from aqueous solutions of metal chlorides by means of a bipolar electrolytic cell positioned in a large container or tank. A typical conventional bipolar electrolytic cell usually consists of a housing in the form of a box having an open top, in which are positioned a large number of spaced-apart, parallel electrodes, usually of graphite. Electrical connections are made to two or more, but not all, of the electrodes for supplying electrical energy to the cell. Electrodes are, in effect, connected in series electrically through the electrolyte in the cell. At the top and bottom of the housing on both sides thereof, there are tubes leading into the housing. A sufficient number of these tubes, which constitute inlet and outlet tubes, are provided to communicate with each one of the spaces between two adjacent electrodes. Every two adjacent electrodes, and the space therebetween, constitutes a unit cell. The housing is supported above the floor of the container or tank, the latter being filled with electrolyte.

The electrolyte enters each unit cell through the lower tubes (these being below the level of the electrolyte in the tank), is electrolyzed in the unit cells and the electrolyzed solution is discharged to the tank by the upper tubes, the tank constituting a common reservoir for all cell units. In many cases, circulation of the electrolyte from the tank to the unit cells and back to the tank is obtained without the use of pumps or other similar positive displacement circulating devices. However, a pump may be employed if desired. In cases where the common reservoir tank is positioned remote from the electrolytic cell instead of being positioned with the electrolytic cell therewithin, some form of pumping arrangement is required.

While electrolytic cells of the aforementioned type with their associated tanks are in wide-spread use, their commercial utilization is subject to a number of disadvantages. Thus, as aforementioned, inlet and outlet tubes are employed because of the necessity to minimize current leakage between adjacent unit cells. However, the use of tubes creates problems with respect to obtaining good circulation of electrolyte from and to the electrolytic cell when natural circulation is relied upon, and this naturally has an effect on efficiency.

Furthermore, notwithstanding the use of such tubes, current leakage from unit cells, such as those described and now in use, does occur, and in many cases is a significant factor in decreasing the efficiency of operation since the tubes must be reasonably large to promote adequate circulation. The potential between an electrode in the electrolytic cell in the tank may be quite high, i.e. the end electrodes of the cell may be at +60 and —60 volts respectively, while the tank is at zero volts, and this difference in potential promotes current leakage, the degree of current leakage being greater as the difference in potential increases. With conventional electrolytic cells of this type, the maximum voltage drop across the electrolytic cell which normally has been employed is about 120 volts.

Other bipolar electrolytic cells which have been designed to avoid many of the difficulties inherent in monopolar cells have brought about several different major problems. Such bipolar cells were usually designed to operate with a gas phase above the level of the liquor and below the cell cover. The electrical connections to the graphite electrode were situated in this gas phase and accordingly, the danger of sparks occurring with the resultant explosion hazard was always present.

It has also been common practice to construct electrolytic cell tanks and cell boxes for use in the electrolytic production of these products of concrete, slate, steel (in cases where the steel becomes a part of the cathode in the cell box), and steel lined with ceramic or rubber. Thus, according to conventional practice, the tank for the electrolytic cell may comprise bottom and side walls constructed of steel coated with a non-conductor, such as rubber or polymerized vinylidene chloride, and non-conducting end walls which may be made of any corrosion-resisting material having substantial strength and rigidity, such as polyvinyl chloride, hard rubber or metal having a non-conducting coating, such as rubber, on the interior faces. The bottom, sides and ends may be fastened together to provide a totally-joined, leak-proof chamber, which is open at the top.

A cell tank or cell box fabricated from concrete according to conventional practice produced a heavy and cumbersome structure. Materials such as concrete, slate, or steel are not considered to be flexible materials and this inhibits freedom in the design of the electrolytic cell tanks and cell boxes. Because of the corrosive nature of the electrolysis reaction, it was necessary to protect the cell tank and protecting the cell tank lining by means of a tile lining has been suggested. However, it was found that the tiles were either porous when installed or became porous during the course of operation of the tile. Furthermore, the joints between the tiles were vulnerable to chemical attack. Finally, the tolerances in the dimensions when the cell was constructed were relatively large. Thus, concrete and ceramic tile eventually tended to become electrically conductive after they had been immersed in an electrolyte. Furthermore, concrete and ceramic tile were unable to tolerate wide variations of the temperature of the electrolyte because of the problems arising from cracking. Finally, concrete and the cement which was used to hold the ceramic tiles in place contain constituents which leach out in the electrolyte, thereby contaminating the electrolyte and forming deposits on the cathode electrodes. A similar type of problem arose when slate was used, since slate contains constituents that will leach out in the electrolyte.

In certain other cells of the bipolar type in which the cell was provided with a lining of rubber, it had been found that the rubber was likely to fail since rubber has the distinct disadvantage of hardening with age and becoming brittle and cracking, thereby permitting the corrosive electrolyte to attack the shell of the cell, particularly in the cover. A failure of this type was likely to result in production losses due to partial or complete shut-downs, and to high maintenance costs.

Cell tanks and boxes fabricated of, or with liners formed from, such materials have relatively short life because of the corrosive environment in which they are used in a relatively short time they must be replaced or repaired because of chemical attack by the electrolyte during electrolysis. This is a most serious, but not the only, disadvantage of cell tanks and boxes constructed according to conventional practice of such materials.

In order to overcome the disadvantages of cell tanks and boxes constructed of such materials, the use of polyvinyl chloride has been suggested. It has indeed been found that cell tanks and boxes constructed of polyvinyl chloride and used, i.e. in the electrolytic production of sodium chlorate from sodium chloride brine, are characterized by improved corrosion resistance. Recently it has been proposed that even better corrosion resistance and longer life for a cell tank or cell box could be obtained if the cell were constructed of a grade of polyvinyl chloride that is free from both solvents and plasticizers for the polyvinyl chloride, and if the joints of the cell tank or cell box are welded using such polymer.

It has also been proposed that cell tanks and cell boxes be fabricated either from polyvinyl dichloride or polyvinyl difluoride. Polyvinyl dichloride and polyvinyl difluoride are reputed to be resistant to chemical attack from electrolytes of the types that are used in the electrolytic production of halogens, hypohalites, halites and perhalites of the alkali metals. Such polymers are alleged to be lighter materials, more easily repaired if physically damaged and more readily pre-fabricated than the materials described hereinabove which have been used in the past. Furthermore, such materials are alleged to remain non-conducting electrically after having been immersed in an electrolyte. They can also be welded, drilled, bolted and readily cut. However, the use of such polymers as the sole component in the structure of an electrolytic cell suffers the principal disadvantage that the cell so constructed is not structurally rigid.

Similar problems have occurred in electrolytic diaphragm cells of the alkali chlorine type. Thus, in industry today many operations are performed in the preparation of the bottom assembly of a conventional diaphragm-type electrolytic cell, and especially for the production of the metallic parts located in the bottom thereof. Typically, the soft metallic material, usually lead, utilized to convey current from the bus bar to the anode of the cell, is normally covered with an epoxy-coal tar composition for the alleged purpose of sealing the metal parts from the interior of the cell. Upon completion of such alleged sealing of the soft metal bottom, the cell is covered with a thick layer of mastic or organic sealant, thus alleging to afford more protection for the metallic portions of the bottom of the cell from attack by the hot chlorinated brine during electrolysis of the alkali metal chloride solutions.

Another method proposed for protecting the cell bottoms was the provision of layers of mastic and layers of grout between the soft metal conductors in the bottom of the cell and the interior of the cell.

It has further been proposed to provide a lining which would reduce considerably the man-hours necessary for properly lining a cell bottom in a typical electrolytic diaphragm-type alkali chlorine cell. The lining proposed was one which allegedly would be extremely resistant to the activity of hot chlorinated brines encountered during electrolysis of alkali metal solutions. Thus, it has been proposed that, by spraying the metallic portions of the bottom of an electrolytic alkali chlorine cell with an organic sealant (i.e. a bituminous material), then affixing to the sealant prior to its drying a sheet of inert fibrous material, such as asbestos, paper, or cloth, and finally coating the inert fibrous material with sealant, an effective lining was alleged to be presented to the hot chlorinated brine solutions encountered in electrolytic cell operation.

There have been several previous additional attempts to produce other plastic cell liners. These attempts have been substantially unsuccessful because of cracking, warping, delamination, and other types of structural failures. This lack of success has been particularly notable in attempts to produce a seamless one-piece liner.

There is continued interest in the production of such liners because an acceptable plastic liner would have many substantial advantages, i.e. resistance to attack by chemicals, low cost, ease of installation, maintenance and repair, elimination of the layer which has been conventionally used as a liner material and elimination of other metallic or conductive members from electrolytic cells, thereby substantially eliminating stray current which decreases the efficiency of the electrolytic function of the cells.

A proposal has been made to provide a cell liner formed from a plastisol. According to such proposal, a polyvinyl plastisol would be formed into a cell liner having appropriate configuration by a mold-coating and curing process. The liner would be pre-heated to render it sufficiently flexible so that it may be caused to assume substantially the shape of the cell into which it was to be inserted. Upon cooling, the liner would be in substantially close contact with the wall of the cell and would allegedly conform with a great degree of accuracy to the configuration thereof, as compared with conventional liners. It has been suggested that unexpected superior results may be obtained if certain dimensions of the molded liner were the same as the corresponding dimensions of the cell, while certain other dimensions were either less than or greater than other corresponding dimensions of the cell. In the case where a polyvinyl chloride plastisol was used to produce a substantially rectangular cell liner, the molded liner would be slightly undersized in width and depth, full-sized in length, and the end flanges thereof would be slightly oversized. Such proposal was unfeasible since the cell liner was generally inconvenient to produce.

The conventional electrolytic cell may also be provided with a cover member which, according to conventional practice, may be bolted to the side walls by a plurality of bolts which traverse a flange member welded to, or otherwise forming, an integral part of the side walls. Between the cover member and the flange member a rubber lining and an asbestos gasket are usually provided, according to conventional practice, to prevent leakage from inside of the cell.

It is now appreciated that rubber-lined steel covers for such cells are not always satisfactory because of pores developed in the rubber lining. This results in both current leakage and problems of corrosion.

Applicant has previously proposed in his Canadian Pat. No. 741,778, as well as in his pending Canadian application Ser. No. 928,684 filed Apr. 21, 1965 (United States application Ser. No. 543,261 filed Apr. 18, 1966, now U.S. Pat. No. 3,463,722) to provide an all-plastic cell cover, for example, a fiberglass-reinforced polyester cover. While such a cover is feasible, the designs heretofore have been rather complex. Such complex designs offer construction problems, as well as problems in selecting suitable materials chemically resistant to the liquor. Polyester resins which are now commercially available have been found to be not sufficiently chemically resistant to attack, and a lining adhered to such polyester resins, e.g. a polyvinyl chloride lining, would, therefore, have to be employed. However, even such a lining may tend to give maintenance problems because of the uncertain means of adhering the lining to the plastic cover itself. Alternatively, the cover could be fabricated of polyvinyl chloride sheeting. However, applicant has found that where fabrication is required involving thermal and/or solvent-welding, the maintenance problems are considerable, particularly when one has to consider thermal expansion and/or contraction problems which are inherent in such construction.

Attempts have also been made to solve the problem of current leakage within the cell. A bipolar electrolytic cell has been proposed that included a housing adapted to receive and contain electrolyte. At least three electrodes were positioned in the housing in spaced apart relationship with respect to each other, each set of two adjacent electrodes and the space therebetween constituting a unit cell for the electrolysis of an electrolyte occupying the space between the two adjacent electrodes. Each of the electrodes in a set of two adjacent electrodes were disposed to face each other. Means were provided defining a plurality of individual chambers, each one of these individual chambers being connected in liquor flow relationship with a different one of the unit cells for passage of electrolyte into respective ones of the unit cells from the individual chambers connected thereto, and out of respective ones of the unit cells into the individual chambers also connected thereto. The total volume defined by the individual chambers plus that of the spaces between the adjacent electrodes constituted substantially the only volume provided for chemical reactions as the result of electrolysis of the electrolyte to take place in the electrolyte. Since there need not be any physical member spearating the electrolysis zone of the unit cell from the individual reaction zone, it was though that circulation could be considerably improved and could provide a greater flow of electrolyte over the electrode faces, which would allegedly result in improved current efficiency.

It was also thought that the electrolytic cell so constructed would allegedly have virtually no current leakage between adjacent unit cells or between adjacent reaction zones because they were essentially isolated from each other. It was though that current leakage could be kept to a minimum even when adjacent unit cells were cascaded, which could be done by interconnecting the reaction zones because the passages interconnecting the reaction zones were made quite small, thereby establishing the path of high electrical resistance.

It is appreciated that when the bipolar electrolytic cell has essentially no current leakage, voltages in excess of 120 volts can be employed. This would be advantageous since rectifier costs and bus bar costs decrease with increasing voltage so that the cost of rectified current decreases when the voltage is increased.

An object, therefore, of one aspect of the present invention is to provide a means to lower the construction costs of an electrolytic cell.

An object of another aspect of the present invention is to provide an electrolytic cell which is constructed in part from conventional-type tanks to take advantage of the reinforcement and safety characteristics of such tanks.

An object of yet another aspect of the present invention is to provide a particular construction technique for constructing such tank to close tolerances.

An object of another aspect of the present invention is the provision of an electrolytic cell in which a particular outer shell, inner lining and intermediate bonding material is provided.

An object of yet another aspect of the present invention is the provision of a novel system of providing the lining for the electrolytic cell.

An object of yet another aspect of the present invention is the provision of a novel means of anchoring the lining to the intermediate bonding material.

An object of still another broad aspect of the present invention is the provision of a substantially electrolyte corrosion-resistant cover for an electrolytic cell.

An object of another aspect of the present invention is the provision of such a cover in which problems of thermal expansion and/or contraction are minimized.

An object of yet another aspect of the present invention is the provision of such a cover which is formed in segments in which joints are provided for lengthwise thermal dimensional changes.

An object of another aspect of the present invention is the provision of a special clamping means for clamping the sections of the novel cover together.

An object of yet another aspect of the present invention is the provision of novel clamping means for securing the cover to an upper structure of the electrolytic cell.

An object of still another aspect of the present invention is the provision of means for minimizing current losses within the cell.

Thus, by a main aspect of the present invention, an electrolytic cell is provided comprising, in combination, an electrolytic cell tank and a cover, the cover comprising: three spaced apart sealing members sealingly engaged to an upper surface of the electrolytic cell tank, the sealing members thereby cooperating with a structure on the upper surface of the electrolytic cell tank to provide a separate and distinct inlet manifold for the inlet of liquor to the electrolytic cell tank and a separate and distinct outlet manifold for the outlet of liquor and gaseous products of electrolysis from the electrolytic cell tank, the inner exposed surfaces of the cover including a material selected from the group consisting of rubber and plastics; whereby, on removal of the cover, the manifolds are simultaneously removed, thereby leaving the electrolytic cell open for inspection and/or repair.

By another aspect of this invention, the cover is as described above, and the electrolytic cell tank includes a plurality of longitudinally extending spaced apart bipolar electrodes and two lateral, longitudinally extending monopolar electrodes, the space between adjacent electrodes constituting an electrolytic cell unit; inlet means for admitting liquor into each of the electrolytic cell units; a top header providing an outlet for liquor from each of the electrolytic cell units; and further wherein one of the sealing members of the cover is sealingly engaged with the top header.

By still another aspect of this invention, the cover is as described above, and the cell wall construction of the electrolytic cell tank comprises: (a) an outer structurally rigid shell; (b) an inner lining of a substantially chemically inert plastic material disposed at accurately predetermined locations within the shell; and (c) a mortar filler bonded to the shell and anchored to the lining; wherein accurate tolerances for the dimensions of the electrolytic cell are provided in order to minimize current leakage within the cell, whether or not the electrolytic cell tank has the specific structure described above.

In one embodiment of the aspects of the invention noted above, the cover includes a pair of elevated sections separated by a depressed section, sealing members at the inner surface of the edges of the elevated sections and at the inner surface of the depressed section engaging the upper surface of the electrolytic cell tank, thereby to provide the separate and distinct manifolds.

In a second embodiment of the aspects of the invention noted above, the cover includes (a) the depressed section including a central longitudinally extending depressed trough portion; (b) the pair of elevated sections including a pair of lateral longitudinally extending raised lips co-extensive with the side walls of the trough portion; and wherein the sealing members include: (c) sealing members sealingly engaged between the inner lowermost surface of the trough portion and the upper surface of an auxiliary cover element disposed within the electrolytic cell tank; and (d) sealing members sealingly engaged between the inner surfaces of the lips and the upper surface of opposed walls of the electrolytic cell tank.

In a third embodiment of the aspects of the invention as noted above, the cover extends between side walls of the electrolytic cell tank and further is provided as a plurality of longitudinally abutting and secured segments, particularly where the individual segments of the plurality of longitudinally abutting and secured segments are provided with upstanding marginal flanges, where a compressible material is disposed between flanges of adjacent segments, and where a clamp is provided for clampingly securing the adjacent flanges together, or where the individual segments of the plurality of longitudinally abutting and secured segments are provided with means for securing a clamp to each of the segments, where a flexible compressible material is disposed between lateral edges of the adjacent segments and where a coupling nut is provided for securing the clamps together.

In a fourth embodiment of the aspects of the invention as noted above, the cover includes a flat plate section, sealing members at the edges thereof sealingly engaging upward extensions of mutually opposed walls of the electrolytic cell tank, and a longitudinally extending plate disposed between the bottom surface of the flat plate section and the upper surface of an auxiliary cover element disposed within the electrolytic cell tank, thereby to provide the separate and distinct manifold chambers, particularly where it includes sealing members sealingly engaged between the upper surface of the auxiliary cover element disposed within the electrolytic cell tank and the lower marginal edge of the divider wall to provide for thermal changes of size of the longitudinally extending plate; and sealing members sealingly engaged between the upper marginal edge of the divider wall and the lower surface of the cover in order to provide for thermal changes of size of the longitudinally extending plate.

By a preferred aspect of any of the above-referred to aspects or embodiments of this invention, the outlet manifold has a uniformly increasing cross-sectional area, relative to the direction of outward flow of cell liquor.

By another aspect of the present invention, inlet pipes and/or outlet pipes are provided in the inlet and/or outlet manifolds respectively.

The cell of another aspect of the present invention includes a plastic sheeting as a lining for the cell. This protects the intermediate bonding mortar material against chemical attack and also protects the rubber lining of conventional cells. The use of plastic sheeting makes it possible to employ, as a construction member, a unit which is easily installed. This enables the fabrication of the electrolytic tank to almost exact dimensions and yet also to provide a surface which is resistant to the corrosive effects of the liquor within the cell.

By this particular construction, the invention also provides for a lower tolerance requirement for the shell or supporting structure. The shell or supporting structure may be a rubber or other lined steel tank, or may be a fiberglass-reinforced polyester tank. If the fiberglass-reinforced polyester tank is used, it would not be necessary to provide a rubber lining. However, because of safety considerations due to the possibility of cracking, applicant prefers to use a rubber-lined steel tank. The lower tolerance requirement is an important consideration since applicant has found that the cost will be extremely high if a tank has to be built to such close tolerance that the desired lower current leakages within the cell itself are maintained. The accuracy to maintain such lower current leakages is provided, according to aspects of this invention, by the cell lining location.

This invention also uses, as a construction member, a unit which contains the intermediate bonding mortar until the mortar is set. In other words, the mortar is poured into the designated space to fill the voids, as well as to permit quicker construction.

The present invention also provides special seals inserted in the plastic sheeting units which are used in forming the lining. These seals also provide expansion joints for the plastic sheeting and for the intermediate mortar bonding material. The plastic sheeting is, for practical purposes, considered to be chemically inert to the electrolyte containing in the cell.

The sheeting units are preferably installed using jigs to set them at the precise exact positions, and mortar is employed as a filler between the plastic sheeting and the supporting structure. Anchor means of particular design which will be described in detail hereinafter are also provided for securing the sheeting to the mortar and the mortar to the rubber lining and/or other tank walls.

A novel design of cover for an electrolytic cell has also been provided which employs a curvature to provide a dividing wall between the inlet and outlet headers. This cover also provides a positive seal at the upper structure of the electrolytic cell, namely at the top profile headers of the electrolytic, by employing a rubber profile between the bottom surface of the curved cover and the upper surface of the top profile headers. The electrolytic cell tank end wall is provided with a top flange which has the same contour as the plastic sheeting cover and extends to an elevation close to the top profiles. Thus, the problem of sealing the ends of the tank at the dividing wall is minimized. The curvature of the cover not only provides structural strength for both over and/or under-pressures, but also provides for thermal expansions and/or contractions.

The cross-section may be of any shape as long as it provides a longitudinally extending depressed trough and a pair of lateral longitudinally extending raised portions. Thus, in one embodiment, the cover may have the cross-section corresponding approximately to the graph of the equation $y = \sine x$, from $\pi/2$ to $5\pi/2$ (i.e. it may be a sine curve).

In a second embodiment of this aspect of this invention, the cross-section of the trough portion of the cover corresponds approximately to the graph of the equation $x^2 = 4ay$, i.e. it is in the shape of a parabola.

In a third embodiment of this aspect of this invention, the cross-section of the cover corresponds approximately to the graph of the equation $y = e^{-x^2}$.

In a fourth embodiment of this aspect of this invention, the trough portion of the cover corresponds approximately to the graph of the equation $y = \log a^x$.

In a fifth embodiment of this aspect of the present invention, the cross-section of the cover corresponds approximately to the graph of the equation $$y^2 = \frac{x^3}{2_a - x}$$

i.e. it is in the shape of a cissoid.

In a sixth embodiment of this aspect of this invention, the cross-section of the cover corresponds approximately to the graph of the equation $$y = \frac{e^x - e^{-x}}{2}$$

i.e. it is in the shape of a hyperbolic sine curve.

In a seventh embodiment of this aspect of this invention, the cross-section of the cover corresponds approximately to the equation $$y = \frac{e^x + e^{-x}}{2}$$

i.e. it is in the shape of a catenary.

Furthermore, as an alternative to the depressed section-elevated sections (or vertex-two apex) type cover design of another aspect of this invention, applicant may employ a rectangular cell tank extended above the top profile assembly to provide for an outlet and an inlet header. This would facilitate employing a flat plastic sheeting for the cover. In order to solve the problems with respect to the dividing wall between the manifolds to prevent short circuiting of the liquor, it is necessary to provide for sealing against the top profile, as well as sealing against the cover and the ends of the cell tank. The dividing wall must also be removable in order to make it possible to install the graphite electrodes and the top profile headers. Means are also provided for permitting thermal expansion and/or contraction of the dividing wall and also of the cell cover plate.

In addition, a cover is provided which is formed of a plurality of sub-units with joints provided for lengthwise thermal dimensional changes. There is, in fact, no limitation as to the size of the overall cover. Since the cover is preferably formed of smaller sections, this enables easy maintenance and manpower handling, rather than the use of hoists, cranes, etc. when a large size single cover is used. Special types of clamps are used for clamping the sub-units of the cover sections together. The cover is also preferably secured to the top profiles by a special means.

The cover is particularly adapted to provide a manifold or header for the inlet liquor and an outlet manifold or header for the product transferred from the cell, i.e. the electrolyte containing entrained and/or occluded gas bubbles. The cover is designed so as to maintain sufficient liquor velocity to provide a turbulent flow. This ensures no substantial gas separation. The pipe inserts of the outlet header may have their openings facing the top of the cover. If no such insert pipes are included, the outlet would be provided near the highest elevation, e.g. at one side of the tank.

It is also desirable to incline the cover towards the outlet to provide an approximately constant product velocity. The product flow from the individual cells would accumulate as the cover inclines, thus maintaining less pressure drop throughout the cell. Thus, the inclined cover is an integral part of the outlet manifold for the purpose of maintaining sufficient product velocity and for assuring that there is no significant transfer of gaseous products.

The pipe inserts are for the principal purpose of minimizing current losses from the cell. The cross-sectional area of the piping, the length of the piping, constant conductivity of the liquor and the potential difference all are interrelated to determine the precise value of the current leakage. Thus, by inserting the pipe inserts, applicant artificially creates a length which is inside the cell and thus, due to the construction, takes very little space, and is virtually maintenance-free with a minimum pressure differential.

The cell of various aspects of this invention is specifically and expressly filled with the electrolyte. Operation of the cell should be carried out at a high velocity throughout so that the gaseous products of electrolysis are maintained in the electrolyte as finely divided bubbles. It is also desirable to provide for turbulent flow in the portion of the cell between the upper profile headers and the cell cover. The high velocity is usually between about 2 and 100 ft./sec. with a preferred rate being of the order of 10 ft./sec. The high velocity not only maintains the gaseous products of the electrolysis reaction entrained in the electrolyte but also mixes the fresh electrolyte with the recirculating electrolyte.

The plastic material which may be used for the sheeting lining of the cell and also for the plastic cover includes polyvinyl chloride, polyvinyl dichloride, polyvinyl difluoride, polyethyelne, polypropyene, and those known by the registered trademarks of Penton (chlorinated polyether derived from 3,3-bis(chloromethyl)oxetane, a thermoplastic resin), Plexiglas (a thermoplastic poly(methyl methacryate)-type polymer available in sheet form) or Perspex a methyl methacrylate resin available in sheet form.

The mortar may be any chemically-resistant mortar, preferably with low shrinkage characteristics and good bond to the rubber lining. Mortars may be made from the cement known by the trademark of Ciment Fondu, a typical cement which contains 44% alumina, 40% lime, 10% silica, and 3.5% metallic iron with small amounts of magnesia and ferric oxide or polyester resin mortars, such as that known by the trademark of Hetron (one of a line of polyester resins).

In the accompanying drawings:

FIG. 2 is a central longitudinal section through the cell of FIG. 1;

FIG. 3 is a section through a typical wall structure of the cell of FIGS. 1 and 2;

FIG. 4 is an isometric view of the typical anchor plate used in the wall constructions shown in FIG. 3;

FIG. 5 is a section through another embodiment of a typical wall structure which may be used in the cell of FIGS. 1 and 2;

FIG. 9 is an isometric view of a detail of the electrolytic cell cover of an aspect of this invention;

FIG. 10 is a section through the electrolytic cell cover of FIG. 9 showing the manner of clamping the cover sections together;

FIG. 11 is a central transverse section of another electrolytic cell of an aspect of this invention showing the cover and manifold structure of a further aspect of the present invention;

FIG. 12 is an isometric view of the electrolytic cell cover of another aspect of this invention;

FIG. 13 is a section through the electrolytic cell cover of FIG. 12 showing the manner of clamping the cover sections together;

FIG. 14 is a section through yet another electrolytic cell cover of another aspect of this invention;

FIG. 15 is a top plan view of a cover according to yet another aspect of this invention;

FIG. 16 is a section along the line A—A of FIG. 15;

FIG. 17 is a section along the line B—B of FIG. 15;

FIG. 18 is a section along the line C—C of FIG. 15;

FIG. 19 is an isometric view of a detail of an electrolytic cell cover of still another aspect of this invention; and FIG. 20 is a central transverse section through the cell of FIG. 19.

Figure 1:
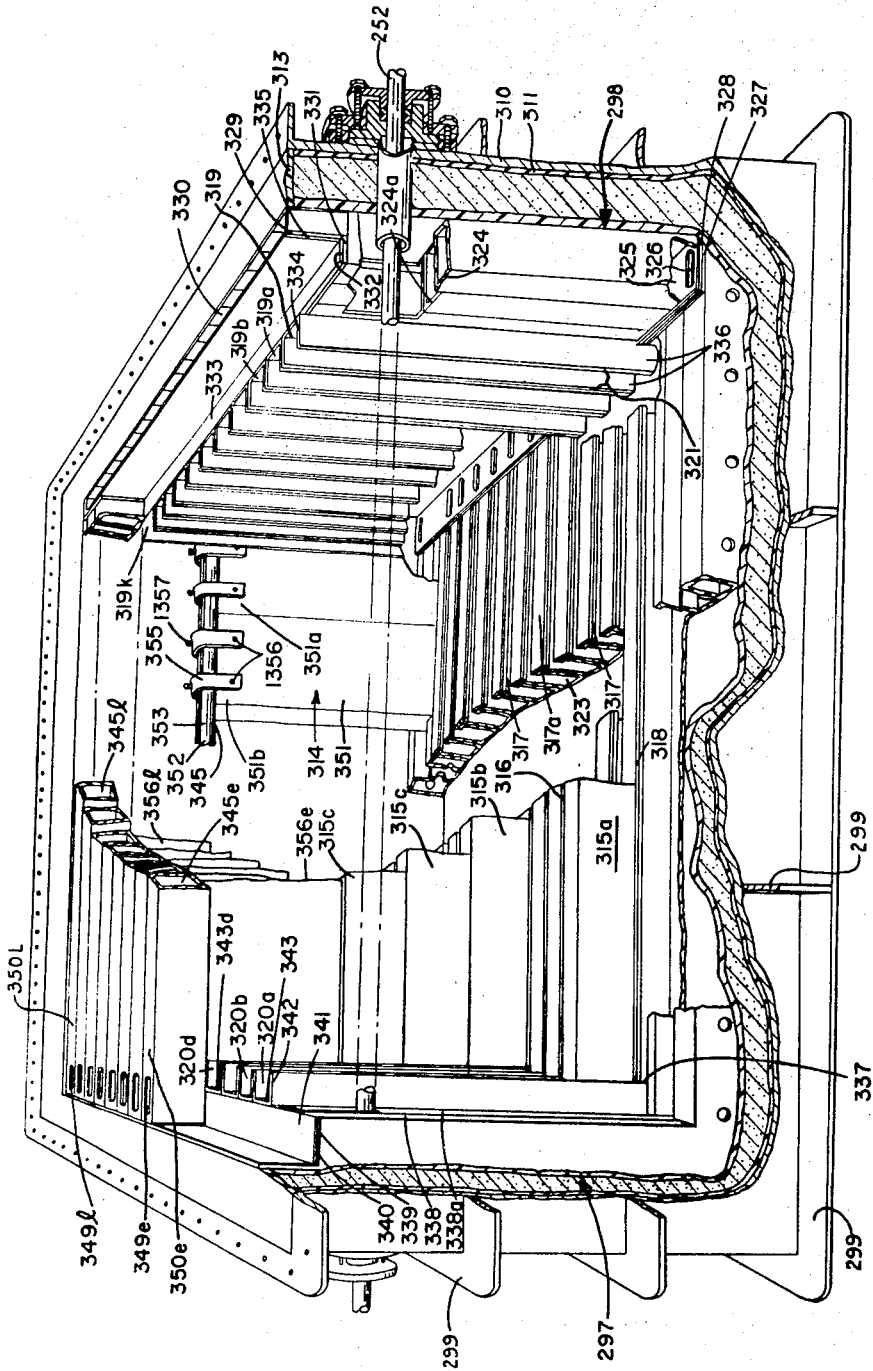
FIG. 1 is an isometric view, partially broken away, of an electrolytic cell of an aspect of this invention showing the novel wall construction.

Turning firstly to FIGS. 1 and 2, it is seen that the electrolytic apparatus comprises a main, rigid, durable outer shell 310, which may preferably be formed of steel. Such shell 310 is provided with a liner 311 which may be of natural rubber, "Hypalon (the trademark for chlorosulfonated polyethylene, a synthetic rubber), or other suitable material which affords both electrical and chemical resistance. Disposed on the inside, as an inner lining of the cell, is a plastic sheet 313. The plastic material of such sheet may be polyvinyl chloride, polyvinyl dichloride, polyvinyl difluoride, polyethylene, polypropylene, Penton, or methacrylates such as Plexiglas or Perspex. Disposed between the inner lining 313 and the rubber liner 311 is a mortar, grout, or polyester-type cement 312. The steel outer shell 310 is braced and rigidified by mutually transverse flanges 299 forming a grid on the outer surface of the wall.

The substantially cell-liquor-inert chemically-resistant plastic lining 313 also serves the important function of maintaining close tolerances of the dimensions within the cell. This serves to minimize current leakage between the adjacent rods 352 where a plurality of rods are provided. Only two of such rods are shown in FIG. 1.

The electrolytic cell of this aspect of the present invention is based on a modular construction. While the embodiment of FIGS. 1 and 2 shows only one module, namely between the two rods 352, the cell unit may comprise any number of modules, each electrically connected either in parallel or in series as may be desired. If they are connected in parallel, alternate bipolar electrodes will be connected individually to an anode bus bar and to a cathode bus bar. If, however, the modules are connected in series, it is only necessary to have an alternatively varying arrangement of anode-cathode-anode, etc.

Each module of this aspect of the present invention comprises a pair of spaced apart monopolar electrodes 314 and a plurality of closely spaced bipolar electrodes 315. Each of the bipolar electrodes 315 is provided by a plurality of vertically stacked longitudinally disposed graphite electrodes 315a, 315b, 315c, 315d, etc. The graphite electrodes 315a, 315b, 315c, 315d, etc. may be joined together between their longitudinally extending top and bottom faces in a manner as set forth in applicant's earlier issued Canadian Pat. No. 714,778. Alternatively, the individual graphite electrodes 315a, 315b, 315c, 315d, etc. in the stack, may be adhered together at their joints to provide a chemically-resistant joint by using a suitable cement to fill the voids between the plates when they are assembled. The cement would solidify as a solid gasket seal. A suitable type of cement is a polyvinyl chloride cement but other cements or compounds could be used, such as polyesters or various types of rubbers or plastics.

The lowermost graphite bipolar electrode in the stack, namely 315a, may be mounted on the bottom of the tank in a manner taught in applicant's earlier issued Canadian Pat. No. 741,778. However, an alternative construction which will be described hereinafter may also be used. Similarly, the upper bipolar electrode in each stack, namely 315c, may be rigidly secured within the module in a manner as described in applicant's earlier issued Canadian Pat. No. 741,778. On the other hand, it may be held in place in a manner to be described hereinafter.

Each module consists of a plurality of electrolyte chambers or inter-electrode spaces 316, each of the chambers having a longitudinally extending slotted inlet 317 to provide for the entry of the electrolyte to each chamber 316. Thus, each electrolyte chamber 316 is bounded on its sides by the opposed side faces of the stack of electrodes 315a, 315b, 315c, 315d, etc. The slotted inlet means are spaced apart by a distance 317 which is greater than the thickness of the graphite bipolar electrodes 315a, 315b, 315c, 315d, etc. in the stack. Thus, there is provided one stack of such electrodes 315a, 315b, 315c, 315d, etc. preferably situated between a pair of such slotted longitudinally extending inlet means 317. The bottom bipolar electrode 315, of the stack 315a, etc. of each of the stacks rests upon a sealing flexible and compressible chemically-resistant gasket 318 which may be formed of natural rubber, "Hypalon," of other suitable material.

Each stack in the plurality of stacks of bipolar electrodes 315a, 315b, 315c, 315d, etc. is located and positioned within the module by means of a pair of diametrically opposed, vertically disposed, U-shaped channel spacing members 319, 319a, 319b, 319c, etc. and 319k, and 320, 320a, 320b, etc. and 320k. The spacing 321 between the arms 336 of the U-shaped channel spacing member is equal to the thickness of the graphite bipolar electrodes 315a, 315b, 315c, 315d, etc. These U-shaped channel members 319, 319a, 319b, etc. and 319k, and 320, 320a, 320b, etc. and 320k are situated adjacent opposite end walls 298, 297 of the module, and are formed of a chemically and electrically-resistant material such as polyvinyl chloride, polyvinyl dichloride, polyvinyl difluoride, polyethylene, polypropylene, etc.

The slotted bottom inlet channels 317 for each of the interelectrode spaces 316 are individually fed from their respective inlet bottom manifolds 323. The feed inlet to the bottom manifolds 323 may be of any type. Preferably, however, it consists of a plurality of vertically disposed channels 324, 324a, 324b, etc. equal in number to the number of stacks of bipolar electrodes 315a, 315b, 315c, etc., i.e. equal to one less than the number of interelectrode chambers 316 within the electrolytic chamber of the module. The plurality of such vertically disposed channels 324, 324a, 324b, etc. is situated within the main shell 310 and is disposed in a vertical direction along side wall 298, namely disposed btween the plastic cell lining 313 and the U-shaped channel spacing members 319, 319a, 319b, 319c, etc. The vertically extending channels 324, 324a, 324b, etc. are provided with a common bottom plate 325 rigidly and permanently secured thereto, the bottom plate being provided with a plurality of slotted apertures 326, therein to communicate with each of inlet manifolds 324. A common bottom sealing plate 327 is also rigidly secured to the bottom manifolds 323, and this plate, in addition, has a plurality of slotted apertures (not shown, but corresponding to apertures 326) therein. Disposed between the sealing plate 325 of the inlet channels and the sealing plate 327 of the bottom manifold is a slotted gasket 328, the slots being in registry with the slots 326, in the sealing plate 325 and the registering slots in plate 327. The slotted sealing plates 325 and 327 and the gasket 328 are each made of a suitably chemically and electrically-resistant material such as rubber, polyvinyl chloride, polyvinyl dichloride, polyvinyl difluoride, polyethylene, polypropylene, etc.

Disposed at the top of inlet channels 324, 324a, 324b, 324c, etc. is an L-shaped member, the vertical portion 329 thereof defining a common inlet header 330 for the inlet conduits 324, 324a, 324b, 324c, etc. The horizontally extending leg 331 of the L-shaped member extends inwardly into the cell as far as the U-shaped channel members 319, 319a, 319b, 319c, etc. and provides a ledge 332 whose purpose will be described hereinafter. Disposed on the ledge 332 is a sealing gasket 333 of a suitable chemically-resistant rubbery material. This sealing gasket is disposed a slight distance above the upper ends 334 of the U-shaped channel members 319, 319a, 319b, 319c, etc. Secured to the inner face of the vertically extending leg 329 of the L-shaped member is a sealing liner 335 of a suitable chemically and electrically-resistant material.

The lower portions 3361 of the legs of each of the U-shaped channel members 319, 319a, 319b, 319c, etc. extend below the sealing plate 325 of the inlet channel to which the U-shaped channel members are attached. This depending extension 3361 is adapted to provide a flange which enters a key-way 337 provided in the upper face 317a of the bottom manifold 323 leads to the longitudinally extending inlet channel 317 of each module. This cooperation, therefore, assists in locking the inlet conduit sub-assembly in the desired position.

The other plurality of U-shaped channel members 320, 320a, 320b, 320c, etc. are connected to a respective and corresponding plurality of recirculatory conduits 338, 338a which, in their bottom structure, are identical with the bottom structure of the inlet conduits 324, 324a, 324b, 324c, etc. and will not, therefore, be described further. However, the upper portion of each of the recirculatory conduits 338, 338a, is provided with a sealing closure plate 339 rigidly secured to the top thereof to provide a ledge 340. Ledge 340 is provided with a sealing gasket 341 superimposed thereon, the eventual height of the gasket 341 being slightly higher than the upper extremity 342 of the U-shaped channels 320, 320a, 320b, 320c, etc. which are attached to the recirculatory conduits 338, 338a. The recirculatory conduits are connected at the upper reaches thereof to the respective upper liquor chamber provided between adjacent divider plates 356, etc. and by means of respective slots 343.

Vertically extending non-electrically active liquor chambers provided between adjacent divider plates are connected to longitudinally extending top profile headers 345, 345e, 345l by means of slotted communicators 346 on the bottom face 347 of the top profile headers 345, 345e, 345l. Liquor is discharged into outlet manifold (not shown) through slotted outlets 349, 349e, 349l in the upper diametrically opposed surfaces 350, 350e, 350l thereof. The chambers provided between adjacent divider plates 356, 356a, 356b, 356c, etc. also discharge into recirculatory conduits 338, 338a, by means of slots 296 which register with slot 343.

As is conventional with bipolar electrolyte cells, the lateral terminal stacks of bipolar 315 electrodes are each situated adjacent a monopolar electrode 314. The monopolar electrode 314 consists, in one embodiment hereof, of a plurality of vertically extending graphite electrodes 351, 351a. These graphite electrodes extend throughout the entire operative electrolytic height of the electrolytic module electrodes. One of the electrodes 314 is the anode and the other of the electrodes is the cathode, and it is irrelevant which electrode is the cathode or the anode. It is preferred that each of the connectors 252 which connect the monopolar electrode 314 to the positive or to the negative poles comprises a solid core 352 of high electrical conductivity, namely of copper, aluminum, or other suitable electrical conducting material. The core 352 is sheathed with a tube of an electrically conducting, chemically-resistant material 353 such as titanium, zirconium, or the like. A 180° segment of the circumference of the chemically-resistant tube is platinized at 345 so that all areas of contact between the graphite monopolar electrode 314 and the connector 252 is through a platinum-to-carbon connection. The connection is assured by means of U-clamps 355 rigidly secured, as by titanium bolts 1356, to the graphite electrodes 351, 351a, and to the connector 252 by means of titanium bolts 1357. The electrode passes out the side walls of the electrolytic apparatus through a gland structure which is shown in FIG. 1 but which will not be described further.

To recapitulate, each electrolytic sub-cell is provided with an electrolyte chamber 316 which is longitudinally bounded by the bipolar stacked electrodes 315a, 315b, 315c, 315d, etc. or alternatively by the bipolar electrode stack and a monopolar electrode 314. The sub-cell also includes a non-electrolysis chamber defined between adjacent divider plates 356 wherein the products of the electrolysis accumulate, the chamber being longitudinally bound by plates 356e, 356l formed of suitable electrically non-conductive and chemically-resistant plastic material such as polyvinyl chloride, polyvinyl dichloride, polyvinyl difluoride, polyethylene, polypropylene, etc. Each of the chemically inert and electrically non-conductive divider plates 356, 356a, 356b, etc. consists of a longitudinally extending plate provided at one end with a cross-plate 357 which is selected to be of the same width as each of the stacked bipolar graphite electrodes 315, 315a, 315b, etc. The cross-piece 358, at the other end of the longitudinally extending electrically non-conducting divider plates 356, 356e, 356l is provided with a slot 343, in registry with a corresponding slot 296, such slots leading to the recirculatory conduits 338, 338a, 338b. Also mounted at the upper portion of each of the longitudinally extending divider plates 356, 356e, 356l is a longitudinally extending hollow top profile header 345, 345e, each provided with the aforementioned slotted opening 346, in the respective lower faces 347, at a position adjacent the inlet conduits 324, 324a, of the electrolytic apparatus. The longitudinally extending top profile headers 345, 345e, 345l are each provided with the aforementioned slotted outlet aperture 349, 349e, 349l in the respective upper faces 350, 350e, 350l adjacent the recirculatory conduits 338, 338a. The slots 349, 349e, 349l discharge to an outlet manifold (which is not shown in FIGS. 1 and 2).

The internal circulation within the cell is shown more clearly in FIG. 2 and depicted schematically by the various arrows. The electrolyte and liquor enter by inlet conduit generally indicated as 324 and are distributed to flow upwardly from manifolds generally indicated as 323 via slots generally indicated as 317. The lighter liquor and electrolyte containing entrained gaseous products of electrolysis move upwardly from slot generally indicated as 317 to the lower face generally indicated as 347 of top profile header generally indicated as 345 until it reaches outlet slot generally indicated as 346. Then the liquor travels through top profile header generally indicated as 345 and through slot generally indicated as 349 to a manifold which is not shown. Some of the lighter liquor and electrolyte moving upwardly from slot generally indicated as 317 is caused to enter recirculatory conduit generally indicated as 338 through slots generally indicated as 343 and slots generally indicated as 296. Such liquor and electrolyte now flow downwardly in recirculatory channel generally indicated as 338 to slot generally indicated as 3261, where it enters manifold generally indicated as 323 to be redistributed and recirculated through elongated slot generally indicated as 317. Thus, within the cell, flow is by means of forced external circulation by liquor pumped downwardly in conduit generally indicated as 324, and forced upwardly through slot generally indicated as 317. In addition, flow is provided through the inter-electrode spaces generally indicated as 316, upwardly into enlarged non-electrolysis channel generally indicated as 344, and downwardly through recirculatory conduit generally indicated as 338.

Turning now to FIGS. 3 and 4, it is seen that the cell walls are made up of a steel outer shell 310, a rubber or other chemically-resistant liner 311 adherent to the steel shell, an inner plastic lining 313, and mortar 312. The inner plastic lining 313 is made up of a plurality of discrete and finite sized plastic sheets 11, 12, 13, etc. Each plastic sheet is provided with a plurality of plastic anchors composed of a first face 15 secured, as by heat sealing, to the inside face 14 of each of plastic sheetings 11, 12, 13, etc. The plastic anchor also includes a second face 16 extending outwardly from face 15 at an angle greater than 90°, i.e. at an angle of about 120°. Face 16 is provided with some means to ensure adequate adhesion of the mortar 313 to the face 16. As shown in FIG. 4, these means comprise a plurality of apertures 17 in the face 16. However, alternative means, such as a roughened surface on face 16, or barbs or prongs, etc. may be provided on face 16.

The wall, as shown in FIG. 3, is designed to provide for thermal expansion and/or contraction. For this reason, special joints have been provided which serve a dual purpose, namely to permit such thermal expansion and/or contraction in both the plastic sheeting 312 and the mortar 313 and also to seal against the profile assemblies (i.e. U-shaped channel members generally indicated as 319 and 320) and thus minimize current leakages. As shown in FIG. 3, a plurality of resiliently deformable members 20, 23, 26, etc. are provided. Member 20 is disposed between the marginal side edge 18 of sheet 11 and the marginal side edge 19 of sheet 12; member 23 is disposed between the marginal side edge 21 of sheet 12 and the marginal side edge 22 of sheet 13; member 26 is disposed between marginal side edge 24 of sheet 13 and marginal side edge 25 of a further plastic sheet; etc. The resiliently deformable members 20, 23, 26, etc. may be formed of natural or of synthetic rubber, and are preferably hollow. They may, however, also be formed of closed cell sponge rubber, or hollow plastic tubings. When in use, the members include an inner head portion 27, an outer head portion 28, and an intermediate neck portion 29. The neck portion 29 may be made larger or smaller automatically depending upon the thermal expansion and/or contraction of the plastic sheetings 11, 12, 13, etc. Inner head 27 is compressible as required to provide a satisfactory seal against the rubber liner 31 of the outer cell wall 310. Inner head 28 is compressible and seals against the profile assembly, such as U-shaped channel members generally indicated as 319 and generally indicated as 320, shown in FIGS. 1 and 2.

FIG. 5 shows another embodiment of a cell wall construction which is an alternative to the construction shown in FIG. 3. In this case, the plurality of discrete and finite sized plastic sheetings 30, 31, 32, etc. are provided on their back faces with a fiberglass coating 33, 34, 35, etc. Thus, when the mortar 312 is placed between the plastic sheeting 30, 31, 32, etc. and the rubber liner 311 of the steel shell 310, the mortar can penetrate into the interstices of the fiberglass 33, 34, 35, etc. and form a firm bond to the plastic sheetings 30, 31, 32, etc. In all other constructional details, the wall structure shown in FIG. 5 is the same as the wall structure shown in FIG. 3.

Figure 6:
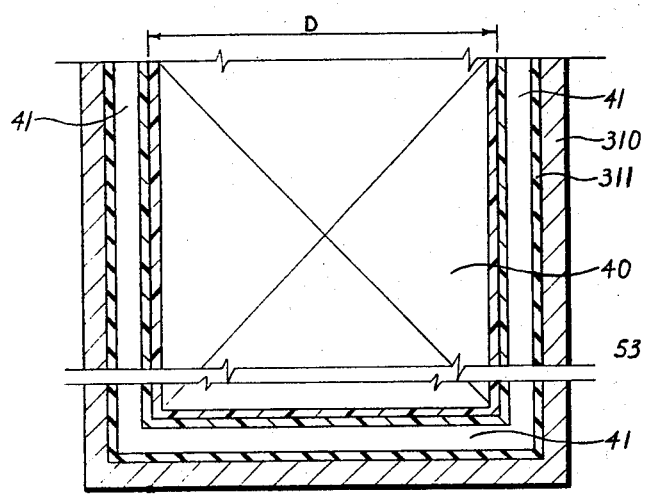
FIG. 6 is a schematic representation of the technique used to construct the novel cell structure.

FIG. 6 illustrates, in rather diagrammatic form, one way in which the improved electrolytic cell of an aspect of this invention may be formed. It is seen that the structurally rigid outer shell, comprising the steel shell 310 and the rubber liner 311, is provided with a jig 40 which is of the precise dimensions desired for the interior of the cell. For example, the jig may be the precise dimensions "D" of the length of the bipolar electrodes generally indicated as 315 and the respective U-shaped sealing channels generally indicated as 319 and generally indicated at 320. The jig is disposed within the cell so that a space 41 is provided for the later introduction of the mortar. The plurality of discrete plastic sheetings 11, 12, 13, etc., as well as the expansion members 20, 23, 26, etc., are placed within the cell and with their front faces touching the exposed surfaces of the jig. Thus, the plastic sheeting to provide lining 313 is installed against the jig. The mortar 312 is then poured behind the plastic sheeting into space 41, the mortar thus filling the voids. When the mortar has set, the jig is removed and the cell construction is formed. Since the jig provides the precise internal dimensions of the cell, it is not necessary to maintain a close tolerance for the exterior of the cell; in other words, it is not essential to have an accurately dimensioned rubber coated steel outer shell.

Figure 8:
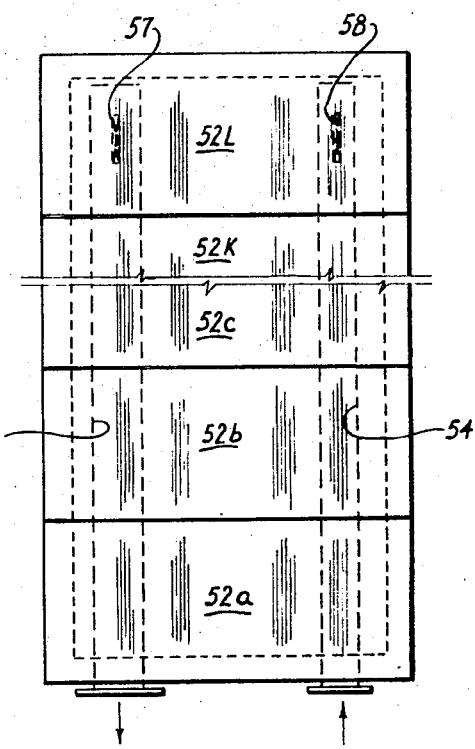
FIG. 8 is a plan view of the electrolytic cell of FIG. 7.
Figure 7:
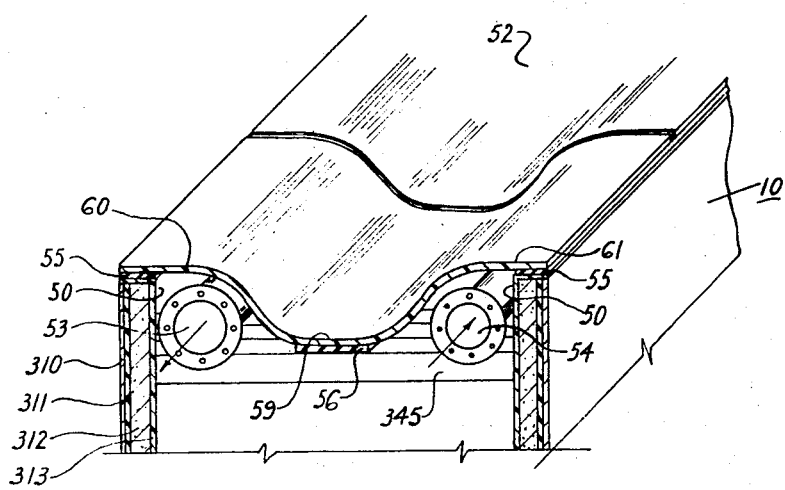
FIG. 7 is an isometric view of the electrolytic cell of another aspect of this invention showing the novel cover structure.

FIGS. 7, 8, and 9 are directed to the improved electrolytic cell cover. As shown in FIGS. 7, 8 and 9, the cell itself, indicated generally by reference numeral 10, is provided with elevated side wall flanges 50 and elevated end wall flanges (not shown) which are curved to provide proper sealing between the cover 52 and the end flanges. It is seen that the cover 52 is provided with a central trough portion 59 which is sealingly engaged with the top profile headers 345 by means of a sealing member 56. The cover also includes a pair of elevated lips 60 and 61 which are sealingly engaged to the top edge of the side flanges 50 by means of sealing member 55. Disposed in the space between the top profile headers 345 and the lip portion 60 is an outlet insert header pipe 53 and similarly disposed in the space between the top profile header 345 and the lip 61 is an inlet insert header pipe 54. Communication between the intlet distributors generally indicated in FIGS. 1 and 2 as 349 of the top headers 345 and the outlet insert header pipe 53 is provided by a plurality of outlet openings 57.

One auxiliary purpose of the outlet header pipe insert 53 and the inlet header pipe 54 is to minimize current losses from the cell. The current leakage is determined by the cross-sectional area of the piping, the length of the piping, the conductivity of the liquor within the cell, and the potential difference. Thus, by inserting the pipe inserts 53 and 54 a "length" is artificially created which has a dramatic effect on the current leakage. Moreover, this length takes up very little space, is virtually maintenance free and has a minimal pressure differential. While the outlet insert header pipe 53 and the inlet insert header pipe 54 are shown within the cell cover, these could also be externally located pipes, with a communication through the cell cover to outlet openings 57 and inlet openings 58.

FIGS. 9 and 10 show one manner in which the various segments 52a, 52b, 52c, etc. of the cover 52 may be secured together. It is noted that in FIGS. 9 and 10, each of the segments 52a, 52b is provided with flange 62 including a rim 64 which is shaped to conform to the curvature of the cover. The flanges appear at the terminal edges of the segments 52a, 52b. As seen more clearly in FIG. 10, a seal and expansion/contraction joint 68 formed of rubber, closed cellular sponges, rubber foam, etc. is disposed between the upright faces of the flanges 62. A clamp 691 of conventional design and construction is employed to hold flanges 62 together.

The cover sections 51a, 52b, are placed on the top of the side wall flange extensions 50 with a sealing means 55 of natural or synthetic rubber, closed cellular sponges, or sponge rubber, etc. disposed therebetween. The cover is then clamped to the side wall flange extensions 50 by means of clamps 65. A plurality of transverse beams 63, e.g. formed of steel, are disposed atop the cover 52 at spaced locations and are clamped to the flange extension 50 by means of clamps 65. The trough portion 59 of the cover is placed on top of the top headers 345 with a sealing means 56 formed of natural or synthetic rubber, closed cellular sponges, sponge rubber, etc. disposed therebetween (see FIG. 14). A longitudinal beam 66 formed of steel or plastic or aluminum or any other suitable member is placed in the trough section 59 superposed over the flanges 62 at the trough portion. Vertically extending means 167 are provided between the lower surface of transverse beams 63 and the upper surface of longitudinal beam 66 in the trough portion 59. One suitable such means is a jack. In this way, an electrolyte seal is provided between the surfaces of the cover which contact the top profile headers 345. This provides, in effect, an inlet manifold section 69 which contains the inlet insert header pipe 54 and an outlet header section 70 which contains the outlet insert header pipe 53.

FIG. 11 shows a typical cross-section of the upper portion of the cell showing the structure and operation of the electrolytic cell cover. The sealing means 56 includes lateral bulbous sealing edges 80 to provide enhanced sealing with the bottom surface of trough section 59. It is noted that the liquor inlet manifold 69 is provided with a liquor inlet insert header pipe 54 which is provided with a plurality of liquor outlets 58. These outlets are disposed in the first quadrant (i.e. in the upper right-hand corner as viewed in FIG. 11) of the circular cross-section pipe 54 so that the liquor which is pumped into the liquor inlet insert header pipe 54 is caused to assume the flow path shown by arrows 81. This provides an efficient means for admission of fresh liquor electrolyte into the electrolytic cell. It is preferred that the outlet apertures 58 be disposed near the terminal end of the inlet header pipe 54 in order to provide the maximum increase in electrical resistance by the additional length of the insert. Although the apertures may be holes, it is also possible to provide outlet means by means of slots.

The cell is also provided with an outlet manifold 70 in which is disposed an outlet insert header pipe 53. The pipe is provided with inlet openings 57 only in the fourth quadrant (i.e. in the upper left-hand corner as viewed in FIG. 11) in order to maintain turbulent flow outside the insert pipe 53, thereby substantially avoiding gas separation. The openings 57 are preferaby provided near the terminal end of the insert header pipe 53 in order to increase the electrical resistance by the length of the insert. Although the openings may be apertures, it is also possible to provide the inlets to the header pipe 53 by means of slots. By providing a configuration and structure as shown, the path of the outlet electrolyte follows the arrows 82.

FIGS. 12 and 13 show an alternative way of clamping cover sections 152a, 152b, 152c, etc. together. As shown in these two figures, the cover segments 152a, 152b, 152c, etc. are of somewhat thicker gauge and are provided with a plurality of anchor holes 72 situated adjacent the lateral edges and sloping downwardly towards the lateral edges. The anchor holes are thus disposed adjacent the marginal edges of the segments 152a, 152b, 152c, etc. The clamps, shown generally as 71, include a clamping "V" which includes three elements. The first element includes a leg 73 which is adapted to project into the anchor hole 72 of segment 151b and an arm 74 which is externally threaded. The second element is a coupling nut 75, which is internally threaded to engage threads on 74 ,and has an apertured end 751. The third element includes a leg 731 which is adapted to project into the anchor hole 72 of segment 751a and an arm 741 which projects through apertured end 751 with a retaining button 761 within coupling nut 75. Disposed between the marginal edges of each of cover segments 152a, 152b, 152c, etc. is the expansion/contraction joint 68. Coupling nut 75 is threaded onto the external threads on arms 74 in order to bring the arms closer together and provide an adequate coupling of cover segments 152a, 152b, 152c, etc.

FIG. 14 shows in cross-section form, one manner of providing the cover 52. It it seen that the cover 52 is curved to provide a substantially flat trough portion 59 whose bottom surface is adapted to rest on rubber sealing means 56, curving upwardly to lateral flat tip portions 60 and 61, the bottom of lip portions 60 and 61 resting upon the elevated side flange 50 with a rubber seal 55 disposed therebetween. The cover portions 52 are rigidified and are simultaneously provided with means for clamping adjacent segments together by means of a flange member which is bent to fit the curved configuration of the cover 52 and which is provided with a vertically upstanding marginal flange portion 62 and a horizontally extending embracing flange portion 64.

Turning now to FIG. 15–18, it is seen that this novel cell cover comprises a main outer cover section 201, provided with a liner 202, of substantially cell-liquor-inert rigid material, such as a glass fiber reinforced resin, e.g. a polyester. Alternatively, it may be a conventional steel cover first lined with an intermediate lining of a glass fiber reinforced polyester resin and then with an exposed lining of rubber. Furthermore, it may be formed of a plastic material, such as polyvinyl chloride, polyvinyl dichloride, polyvinyl difluoride, polyethylene, polypropylene, Penton, Plexiglas or Perspex. The lining 202 may be formed of a plastic material such as polyvinyl chloride, polyvinyl dichloride, polvinyl difluoride, polyethylene, polypropylene, Penton, Plexiglas or Perspex. However, it is preferred that the lining be a natural or synthetic rubber. The rubber may be: a soft rubber of Shore A durometer hardness 30–50; a semi-hard rubber of Shore A durometer hardness of 50–100; or a hard rubber of Shore A durometer hardness above 100.

To achieve the desired strong bond between the main outer cover section 201 and the liner 202, the section 201 is first thoroughly cleaned and roughened, e.g. by being sandblasted. Then a primer cement, e.g. an epoxy base cement, is used to adhere the preformed rubber lining 202 to the section 201. To achieve optimum bonding, it is preferred to cure the section-cement-rubber unit by steam pressure.

The cover section 201 is provided with a protruding outlet manifold 203 and a protruding inlet manifold 204, separated by a substantially flat sealing section 205. The cover section 201 is also provided with a circumferential sealing flange 206.

As shown more clearly in FIG. 16, the outlet manifold 203 is provided with an aperture in wall 211 through which extends an outlet coupling pipe 207 having a coupling flange 208, by which the outlet manifold 203 may be connected to the conventional recirculatory and/or product recovery systems (not shown).

Disposed within and connected to outlet coupling pipe 207 is a hollow cylindrical insert 209 terminating in a closed-ended, open-topped trough 212. This insert is for the purpose of assuring high liquor level within the outlet manifold 203 in cases where the liquor is being transferred externally to the outlet coupling pipe 207 and/or discharged at lower elevation than the top of outlet manifold 203. Furthermore, the pipe insert 209 also serves to minimize and control current leakage from the cell. It is noted that the outlet manifold 203 preferably has a uniformly increasing cross-sectional area relative to the direction of outward flow of cell liquor, i.e. it has a sloping roof 214. The roof is sloped in order to maintain sufficiently high velocity to maintain the liquor in substantially turbulent flow within manifold 203, thereby substantially avoiding separation of entrained and/or occluded gases from the cell liquor.

As an alternative, as shown by the broken lines, instead of outlet coupling pipe 207 extending through an aperture in wall 212, an aperture may be provided in roof 214 at its highest point, and an outlet elbow 210 may be disposed therein. Outlet elbow 210 also terminates in a coupling flange 213. Outlet elbow 210 assures flooded conditions even when there is no flow through outlet manifold 203.

It will be noted, therefore, that the path of outwardly flowing cell liquor with entrained and/or occluded gaseous products is upwardly from the cell into the manifold 203 (as shown by arrows 215), and longitudinally along the manifold 203 to enter the closed-ended, open-topped trough 212 (as shown by arrows 216). The liquor then flows in trough 212 to the pipe insert 209 out of coupling pipe 207 (as shown by arrows 217 and 218) or alternatively, if preferred, upwardly out through coupling elbow 210.

As more clearly seen in FIG. 17, the inlet manifold 204 is provided with an inlet coupling pipe 219 having a coupling flange 220. The inlet manifold 204 may, if desired to minimize and control the current leakage wtihin the cell, be provided with an inlet pipe insert 221 (shown in broken lines). If such insert pipe 221 is provided, it has an apertured top section 222, whereby electrolyte flow follows arrows 223 upwardly into and longitudinally along inlet manifold 204, to enter the cell as shown by downwardly extending arrow 2231. On the oher hand, if no such insert pipe 221 is provided, the electrolyte flow follows arrows 224.

The cover 201 may be secured to the electrolytic cell by means of bolts (not shown) passing through holes 225 in flange 206 and in registering holes in a top flange of the cell. This construction of the cell is shown more clearly in FIG. 1.

FIGS. 19 and 20 show an alternative embodiment of the cover of an aspect of this invention. It will be observed that the cover 452 is composed of segments 452a, 452b which are clamped together and clamped to the top flange of the elevated side wall flange 50 of the cell 10 in the same manner as has been previously described with respect to FIGS. 9 and 10 by means of clamps 65. It is noted, however, with respect to the cover of FIGS. 19 and 20 that the cover elements 452a, 452b are formed of substantially flat sheet members. Disposed approximately along the central longitudinal axis of the cell and resting on, and secured to, the upper surface of the top profile headers 345 is an expansible gripping and retaining means 90. Similarly disposed along the central longitudinal axis on the underface of the cover sections 452a, 452b is a cooperating expansible gripping and retaining means 91. Each of the gripping and retaining means 90 and 91 comprises a hollow, essentially tubular member provided with a central longitudinally extending depression 93. Seated within the opposed depressions 93 is a central longitudinally extending dividing wall 92. Because of the resilient nature of the gripping and retaining means 90 and 91, any expansion and/or contraction of the divider wall 93 is accommodated by the expansible and retractible nature of means 90 and 91. Thus, the dividing wall 92 satisfactorily divides the portion below the cover into an inlet manifold section 69 and an outlet manifold section 70.

The dividing wall 92 between the headers prevents short circuiting of the liquor. Besides sealing against the top profile headers 345, it is seen that sealing is also provided against the cover 452. The ends of the electrolytic cell tank are also sealed in a manner similar to that previously described, i.e. by providing a vertically extending, centrally disposed, expansible sealing means similar to sealing means 90 and 91. The dividing wall 92 is, therefore, removable in order to make it possible to install the graphite electrodes generally indicated as 315 and the top profile headers generally indicated as 345. It is also seen that provision has automatically been made to allow for thermal expansion and/or contraction of the dividing wall 92 while maintaining the adequate liquor-tight seal.

The dividing wall 92 is formed of cell-liquor-inert material. Examples of suitable materials include polyvinyl chloride, polyvinyl dichloride, polyvinyl difluoride, polyethylene, polypropylene, Penton and methacrylates such as Plexiglas and Perspex, etc.

By aspects of this invention, therefore, an improved cell has been provided in which is incorporated a novel cell wall structure and/or a novel cover member. This provides enhanced durability of the cell and ease of construction of the cell.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. An electrolytic cell comprising, in combination, an electrolytic cell tank and a cover, the cover comprising: three spaced apart sealing members sealingly engaged to an upper surface of said electrolytic cell tank, said sealing members thereby cooperating with a structure on said upper surface of said electrolytic cell tank to provide a separate and distinct inlet manifold for the inlet of liquor to said electrolytic cell tank and a separate and distinct outlet manifold for the outlet of liquor and gaseous products of electrolysis from said electrolytic cell tank, the inner exposed surfaces of the cover including a material selected from the group consisting or rubber and plastics; whereby, on removal of the cover, said manifolds are simultaneously removed, thereby leaving the electrolytic cell open for inspection and/or repair.

2. The combination claimed in claim 1 wherein said cover is formed out of plastic material.

3. The combination claimed in claim 2 wherein the plastic material is polyvinyl chloride, polyvinyl dichloride, polyvinyl difluoride, polyethylene, polypropylene, a chlorinated polyether, or a thermoplastic arcylic resin.

4. The combination claimed in claim 1 wherein said cover is formed out of plastic-lined fiberglass reinforced resin.

5. The combination claimed in claim 1 wherein said cover is formed out of rubber-lined fiberglass reinforced polyester.

6. The combination claimed in claim 1 wherein said cover is formed of steel, lined first with an intermediate liner of a fiberglass reinforced resin and then with an exposed lining of rubber.

7. The combination claimed in claim 1 wherein the outlet manifold has a uniformly increasing cross-sectional area, relative to the direction of outward flow of mixed cell liquor and gaseous products of electrolysis.

8. The combination claimed in claim 1 wherein said cover includes a pair of elevated sections separated by a depressed section, sealing members at the inner surface of the edges of the elevated sections and at the inner surface of the depressed section engaging the upper surface of said electrolytic cell tank, thereby to provide said separate and distinct manifolds.

9. The combination claimed in claim 8 wherein said cover is formed out of plastic material.

10. The combination claimed in claim 9 wherein the plastic material is polyvinyl chloride, polyvinyl dichloride, polyvinyl difluoride, polyethylene, polypropylene, chlorinated polyether, or a thermoplastic acrylic resin.

11. The combination claimed in claim 8 wherein said cover is formed out of plastic-lined fiberglass reinforced resin.

12. The combination claimed in claim 8 wherein said cover is formed out of rubber-lined fiberglass reinforced polyester.

13. The combination claimed in claim 8 wherein said cover is formed of steel, lined first with an intermediate liner of a fiberglass reinforced resin and then with an exposed lining of rubber.

14. The combination claimed in claim 8 wherein the outlet manifold has a uniformly increasing cross-sectional area, relative to the direction of outward flow of mixed cell liquor and gaseous products of electrolysis.

15. The combination claimed in claim 8 wherein, in said cover:

(a) the depressed section includes a central longitudinally extending depressed trough portion; and (b) the pair of elevated sections include a pair of lateral longitudinally extending raised lips co-extensive with the side walls of the trough portion;

and wherein the sealing members include:

(c) sealing members sealingly engaged between the inner lowermost surface of the trough portion and the upper surface of an auxiliary cover element disposed within the electrolytic cell tank; and (d) sealing members sealingly engaged between the inner surfaces of the lips and the upper surface of opposed walls of the electrolytic cell tank.

16. The combination claimed in claim 15 wherein said cover is formed out of plastic material.

17. The combination claimed in claim 16 wherein the plastic material is polyvinyl chloride, polyvinyl dichloride, polyvinyl difluoride, polyethylene, polypropylene, a chlorinated polyether, or a thermoplastic acrylic resin.

18. The combination claimed in claim 15 wherein said cover is formed out of plastic-lined fiberglass reinforced resin.

19. The combination claimed in claim 15 wherein said cover is formed out of rubber-lined fiberglass reinforced polyeter.

20. The combination claimed in claim 15 wherein said cover is formed of steel, lined first with an intermediate liner of a fiberglass reinforced resin and then with an exposed lining of rubber.

21. The combination claimed in claim 15 wherein the outlet manifold has a uniformly increasingy cross-sectional area, relative to the direction of outward flow of mixed cell liquor and gaseous products of electrolysis.

22. The combination claimed in claim 15 including: a lateral beam clamplingly securing the lateral edges of the cover to the top of the side walls of the electrolytic cell tank; a longitudinally extending beam in association with the depressed portion; and means for urging the longitudinal and the lateral beams apart.

23. The combination claimed in claim 1 wherein said cover extends between said walls of said electrolytic cell tank and further wherein said cover is provided as a plurality of longitudinally abutting and secured segments.

24. The combination claimed in claim 23 wherein said individual segments of said plurality of longitudinally abutting and secured segments are provided with upstanding marginal flanges, wherein a compressible material is disposed between flanges of adjacent segments, and wherein a clamp is provided for clamplingly securing the adjacent flanges together.

25. The combination claimed in claim 24 wherein said compressbile material is natural or synthetic rubber, sponge rubber or foamed cellular material.

26. The combination claimed in claim 23 wherein said individual segments of said plurality of longitudinally abutting and secured segments are provided with means for securing a clamp to each of the segments, wherein a flexible compressible material is disposed between lateral edges of the adjacent segments and wherein a coupling nut is provided for securing the clamps together.

27. The combination claimed in claim 1 wherein said cover includes a flat plate section, sealing members at the edges thereof sealingly engaging upward extensions of mutually opposed walls of said electrolytic cell tank, and a longitudinally extending dividing plate disposed between the bottom surface of said flat plate section and the upper surface of an auxiliary cover element disposed within said electrolytic cell tank, thereby to provide the separate and distinct manifold chambers.

28. The combination claimed in claim 27 including: sealing members sealingly engaged between the upper surface of said auxiliary cover element disposed within said electrolytic cell tank and the lower marginal edge of the dividing plate to provide for thermal changes of size of said longitudinally extending plate; and sealing members sealingly engaged between the upper marginal edge of the dividing plate and the lower surface of said cover in order to provide for thermal changes of size of said longitudinally extending plate.

29. The combination claimed in claim 27 wherein said cover is formed out of plastic material.

30. The combination claimed in claim 29 wherein the plastic material is polyvinyl chloride, polyvinyl dichloride, polyvinyl difluoride, polyethylene, polypropylene, a chlorinated polyether, or a thermoplastic acrylic resin.

31. The combination claimed in claim 27 wherein said cover is formed out of plastic-lined fiberglass reinforced resin.

32. The combination claimed in claim 27 wherein said cover is formed out of rubber-lined fierglass reinforced polyester.

33. The combination claimed in claim 27 wherein said cover is formed of steel, lined first with an intermediate liner of a fiberglass reinforced resin and then with an exposed lining of rubber.

34. The comination claimed in claim 27 wherein the outlet manifold has a uniformly increasingly cross-sectional area, relative to the direction of outward flow of mixed cell liquor and gaseous products of electrolysis.

35. The combination claimed in claim 1 wherein the outlet manifold is provided with an inwardly projecting hollow cylindrical insert adjacent the effluent port thereof to provide high liquor level within said manifold.

36. The combination claimed in claim 1 wherein said inlet and outlet manifolds extend along the longitudinal axis of said electrolytic cell tank, and further including an inlet pipe insert extending within the inlet manifold along a predetermined length of the inlet manifold, whereby to minimize current leakage in the cell.

37. The combnation claimed in claim 36, including an outlet pipe insert extending inwardly within the outlet manifold along a predetermined length of the outlet manifold, whereby to minimize current leakage in the cell.

38. The combination claimed in claim 36 wherein the communication between the inlet manifold and the inlet pipe insert is provided by apertures in the area of the pipe insert subtending an angle between 0° and 90°.

39. The combination claimed in claim 36 wherein the communication between the outlet manifold and the outlet pipe insert is provided by apertures in the area of the pipe insert subtending an angle between 270° and 360°.

40. The combination claimed in claim 36 wherein the cover includes a pair of elevated sections separated by a depressed section, with sealing members at the inner surface near the edges of the elevated sections and on the inner surface of the depressed section engaging with the upper surface of an auxiliary cover within said electrolytic cell tank, thereby to provide the separate and distinct manifold chambers.

41. The combination claimed in claim 36 wherein the cover comprises:
(a) a central longitudinally extending depressed trough portion;
(b) a pair of lateral longitudinally extending raised lips co-extensive with the side walls of the trough portion;
(c) sealing members sealingly engaged between the inner lowermost surface of the trough portion and the upper surface of an auxiliary cover element disposed within the electrolytic cell tank; and
(d) sealing members sealingly engaged between the inner uppermost surfaces of said lips and the upper surface of opposed walls of the electrolytic cell tank.

42. The combination claimed in claim 36 wherein the cover includes a flat plate section, sealing members at the edges thereof sealingly engaging upward extensions of mutually opposed walls of said electrolytic cell tank, and a longitudinally extending dividing plate disposed between the bottom surface of said flat plate section and the upper surface of an auxiliary cover element within said electrolytic cell tank, thereby to provide the separate and distinct manifold chambers.

43. The combination claimed in claim 42 including: sealing members sealingly engaged between the upper surface of said auxiliary cover member within said electrolytic cell tank and the lower marginal edge of the dividing plate to provide for thermal changes of size of the dividing plate; and sealing members sealingly engaged between the upper marginal edge of the dividing plate and the lower surface of the cover in order to provide for thermal changes of size of the dividing plate.

44. The combination claimed in claim 36 wherein the inlet manifold is adapted to communicate with a plurality of inlet conduits for feeding electrolyte to a plurality of cell units; and wherein the outlet manifold is adapted to communicate with a plurality of outlet ducts for withdrawing electrolyte from a plurality of cell units.

45. The combination claimed in claim 44 wherein the inlet manifold has a uniformly increasing cross-sectional area, relative to the direction of outward flow of mixed cell liquor and gaseous products of electrolysis.

46. The combination claimed in claim 44 wherein the outlet manifold is provided with an inwardly projecting hollow cylindrical insert adjacent the effluent port thereof to provide high liquor level within said manifold.

47. The combination claimed in claim 1 wherein said electrolytic cell tank includes a plurality of longitudinally extending, spaced apart bipolar electrodes and two lateral, longitudinally extending monopolar electrodes, the space between adjacent electrodes constituting an electrolytic cell unit; inlet means for admitting liquor into each of the electrolytic cell units; a top header providing an outlet for liquor from each of the electrolytic cell units, and further wherein one of the sealing members of the cover is sealingly engaged with the top header.

48. The combination of claim 47 wherein the cover includes a pair of elevated sections separated by a depressed section, with sealing members at the inner surfaces of the edges of the elevated sections and on the inner surfaces of the depressed section engaging with the upper surface of said top header within said electrolytic cell tank, thereby to provide the separate and distinct manifolds.

49. The combination of claim 47 wherein the cover comprises:
  (a) a central longitudinally extending depressed trough portion;
  (b) a pair of lateral longitudinally extending raised lips co-extensive with the side walls of the trough portion;
  (c) sealing members at the inner lower-most surface of the trough portion for sealing engagement with the upper surface of an auxiliary cover element disposed within the electrolytic cell tank; and
  (d) sealing members at the inner uppermost surfaces of the lips for sealing engagement with the upper surface of opposed walls of the electrolytic cell tank.

50. The combination of claim 47 wherein the cover includes a flat plate section, sealing members at the edges thereof sealingly engaging upward extensions of mutually opposed walls of the electrolytic cell tank, and a longitudinally extending dividing plate disposed between the bottom surface of the first plate section and the upper surface of an auxiliary cover member within said electrolytic cell tank.

51. The combination of claim 50, including sealing members sealingly engaged between the upper surface of said auxiliary cover member within said electrolytic cell tank and the lower marginal edge of the dividing plate to provide for thermal changes of size of the dividing plate, and sealing members sealingly engaged between the upper marginal edge of the dividing plate and the lower surface of the cover in order to provide for thermal changes of size of the dividing plate.

52. The combination of claim 47 wherein the cell wall construction comprises:
  (a) an outer structurally rigid shell;
  (b) an inner lining of a substantially chemically inert plastic material disposed at accurately predetermined locations within the shell; and
  (c) a mortar filler bonded to the shell and anchored to the lining;
wherein accurate tolerances for the dimensions of the electrolytic cell are provided in order to minimize current leakage within the cell.

53. The combination of claim 52 wherein the outer shell (a) is a rubber-lined steel tank.

54. The combination of claim 52 wherein the outer shell (a) is a fiberglass reinforced polyester tank.

55. The combination of claim 52 wherein the plastic material (b) is polyvinyl chloride, polyvinyl dichloride, polyvinyl difluoride, polyethylene, polypropylene, a chlorinated polyester or a thermoplastic acrylic resin.

56. The combination of claim 52 wherein the mortar filler (c) is a polyester resin.

57. The combination of claim 52 wherein the mortar filler (c) is a cement containing alumina, lime, silica, metallic iron, magnesia and ferrous oxide.

58. The combination of claim 52 including an anchor for anchoring the plastic sheeting to the mortar, the anchor including a surface adapted to be bonded to the plastic sheeting and a second surface disposed at an angle to the first surface provided with means for secure bonding to the mortar.

59. The combination of claim 58 wherein the second surface of said anchor is provided with a plurality of apertures.

60. The combination of claim 52 wherein the plastic material (b) is provided with an integral, pervious lining to enhance the anchoring of the mortar thereto.

61. The combination of claim 60 wherein the said pervious lining is made of fiberglass.

62. The combination of claim 52 wherein said inner lining (b) is composed of a plurality of finite sheets of substantially chemically inert plastic material disposed within the outer structurally rigid shell a predetermined distance from the shell, and disposed in vertical and/or horizontal arrays and including:
  (d) resiliently deformable sealing members disposed between the adjacent marginal edges of vicinal finite plastic sheetings, such resiliently deformable members extending beyond a selected face of the sheeting as far as the inner face of the outer structurally rigid shell, and extending beyond the outer face of the finite plastic sheeting into the interior of the cell.

63. The combination of claim 62 wherein the outer shell (a) is a rubber-lined steel tank.

64. The combination of claim 62 wherein the outer shell (a) is a fiberglass-reinforced polyester tank.

65. The combination of claim 62 wherein the plastic material (b) is polyvinyl chloride, polyvinyl dichloride, polyvinyl difluoride, polyethylene, polypropylene, a chlorinated polyester or a thermoplastic acrylic resin.

66. The combination of claim 62 wherein the members (d) are formed of natural rubber, synthetic rubber, foam rubber or polyethylene or polypropylene.

67. The combination of claim 66 wherein the members (d) are hollow tubes.

68. The combination of claim 62 wherein the mortar filler (c) is a polyester resin.

69. The combination of claim 62 wherein the mortar filler (c) is a cement containing alumina, lime, silica and small amounts of metallic iron, magnesia and ferrous oxide.

70. The combination of claim 62 including an anchor for anchoring the plastic sheeting to the mortar, the anchor including a surface adapted to be bonded to the plastic sheeting and a second surface disposed at an angle to the first surface provided with means for secure bonding to the mortar.

71. The combination of claim 70 wherein the second surface of said anchor is provided with a pluraltiy of apertures.

72. The combination of claim 62 wherein the plastic material (b) is provided with an integral, pervious lining to enhance the anchoring of the mortar thereto.

73. The combination of claim 72 wherein the pervious lining is made of fiberglass.

74. The combination of claim 1 wherein the wall construction of said electrolytic cell tank comprises:
  (a) an outer structurally rigid shell;
  (b) an inner lining of a substantially chemically inert plastic material disposed at accurately predetermined locations within the shell; and
  (c) a mortar filler bonded to the shell and anchored to the lining;
wherein accurate tolerances for the dimensions of the electrolytic cell are provided in order to minimize current leakage within the cell.

75. The combination claimed in claim 74 wherein the outer shell (a) is a rubber-lined steel tank.

76. The combination claimed in claim 74 wherein the outer shell (a) is a fiberglass reinforced polyester tank.

77. The combination claimed in claim 74 wherein the plastic material (b) is polyvinyl chloride, polyvinyl dichloride, polyvinyl difluoride, polyethylene, polypropylene, a chorinated polyether or a thermoplastic acrylic resin.

78. The combination claimed in claim 74 wherein the mortar filler (c) is a polyester resin.

79. The combination claimed in claim 74 wherein the mortar filler (c) is a cement containing alumina, lime, silica, metallic iron, magnesia and ferrous oxide.

80. The combination claimed in claim 74 including an anchor for anchoring the plastic lining to the mortar, the anchor including a surface adapted to be bonded to the plastic lining and a second surface disposed at an angle to the first surface provided with means for secure bonding to the mortar.

81. The combination claimed in claim 80 wherein the second surface of said anchor is provided with a plurality of apertures.

82. The combination claimed in claim 74 wherein the plastic material (b) is provided with an integral, pervious lining to enhance the anchoring of the mortar thereto.

83. The combination claimed in claim 82 wherein said pervious lining is made of fiberglass.

84. The combination claimed in claim 74 wherein said inner lining (b) is composed of a plurality of finite sheets of plastic material disposed within the outer structurally rigid shell a predetermined distance from the shell, and disposed in arrays and including:

(d) resiliently deformable sealing members disposed between the adjacent marginal edges of vicinal finite plastic sheetings, such resiliently deformable members extending beyond a selected face of the sheeting as far as the inner face of the outer structurally rigid shell, and extending beyond the other face of the finite plastic sheeting into the interior of the cell.

References Cited

UNITED STATES PATENTS

| | | | |
|---|---|---|---|
| 1,185,407 | 5/1916 | Jenkins | 204—270 |
| 2,075,688 | 3/1937 | Zdansky | 204—256 |
| 2,816,070 | 12/1957 | Buchanan | 204—279 |
| 2,958,635 | 11/1960 | De Nora | 204—279 |
| 3,247,090 | 4/1966 | Forbes | 204—256 |
| 3,252,883 | 5/1966 | Schick | 204—279 |
| 3,318,792 | 5/1967 | Cotton et al. | 204—279 |
| 3,450,621 | 6/1969 | Anderson | 204—279 |

FOREIGN PATENTS

| | | | |
|---|---|---|---|
| 156,393 | 1962 | U.S.S.R. | 204—279 |
| 643,624 | 1937 | Germany | 204—195 G |

TA-HSUNG TUNG, Primary Examiner

U.S. Cl. X.R.

52—309, 573, 597, 622; 204—95, 255, 256, 268, 275, 278, 279; 264—35